(12) United States Patent
Wang

(10) Patent No.: US 6,885,748 B1
(45) Date of Patent: Apr. 26, 2005

(54) SYSTEM AND METHOD FOR PROTECTION OF DIGITAL WORKS

(75) Inventor: Xin Wang, Los Angeles, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 0 days.

(21) Appl. No.: 09/536,089

(22) Filed: Mar. 24, 2000

Related U.S. Application Data

(63) Continuation-in-part of application No. 09/178,529, filed on Oct. 23, 1999, now Pat. No. 6,519,700.

(51) Int. Cl.$^7$ .............................. H04N 7/167; H04L 9/00
(52) U.S. Cl. ...................... 380/201; 380/212; 713/160; 713/193; 705/51; 705/57
(58) Field of Search .............................. 380/212, 217, 380/201, 28, 42, 44, 45, 47; 358/1.2; 705/1, 57, 56, 51; 713/176, 160, 193; 382/100; 386/46

(56) References Cited

U.S. PATENT DOCUMENTS

| | | |
|---|---|---|
| 3,263,158 A | 7/1966 | Janis |
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,220,991 A | 9/1980 | Hamano et al. |
| 4,278,837 A | 7/1981 | Best |
| 4,323,921 A | 4/1982 | Guillou |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,644,493 A | 2/1987 | Chandra et al. |
| 4,658,093 A | 4/1987 | Hellman |
| 4,713,753 A | 12/1987 | Beobert et al. |
| 4,817,140 A | 3/1989 | Chandra et al. |
| 4,827,508 A | 5/1989 | Shear |
| 4,868,376 A | 9/1989 | Lessin et al. |
| 4,891,838 A | 1/1990 | Faber |
| 4,924,378 A | 5/1990 | Hershey et al. |
| 4,932,054 A | 6/1990 | Chou et al. |

(Continued)

FOREIGN PATENT DOCUMENTS

| | | |
|---|---|---|
| EP | 0 084 441 | 7/1983 |
| EP | 0 180 460 | 5/1986 |
| EP | 0 332 707 | 9/1989 |

(Continued)

OTHER PUBLICATIONS

U.S. Appl. No. 09/469,726, filed Dec. 21, 1999, Xin Wang.
U.S. Appl. No. 09/468,747, filed Dec. 21, 1999, Xin Wang.
U.S. Appl. No. 09/468,703, filed Dec. 21, 1999, Xin Wang.
U.S. Appl. No. 09/469,487, filed Dec. 22, 1999, Xin Wang et al.

(Continued)

Primary Examiner—Emmanuel L. Moise
(74) Attorney, Agent, or Firm—Nixon Peabody, LLP; Marc S. Kaufman

(57) ABSTRACT

A method of protecting a digital work uses a format preserving encryption scheme to encrypt the digital work. This enables any native replay application or rendering application to transform an encrypted digital work into encrypted presentation data. The originator's digital content is protected in its original form by not being decrypted. This method enables the rendering or replay application to process the encrypted document into encrypted presentation data without decrypting it first. Encrypted presentation data is then decrypted just before it is displayed to the user. An additive encryption scheme is a particular type of encryption scheme which preserves formatting of a digital work.

26 Claims, 14 Drawing Sheets

U.S. PATENT DOCUMENTS

| | | | |
|---|---|---|---|
| 4,937,863 A | 6/1990 | Robert et al. | |
| 4,949,187 A | 8/1990 | Cohen | |
| 4,953,209 A | 8/1990 | Ryder, Sr. et al. | |
| 4,961,142 A | 10/1990 | Elliott et al. | |
| 4,975,647 A | 12/1990 | Downer et al. | |
| 4,977,594 A | 12/1990 | Shear | |
| 4,999,806 A | 3/1991 | Chernow et al. | |
| 5,010,571 A | 4/1991 | Katznelson | |
| 5,014,234 A | 5/1991 | Edwards, Jr. | |
| 5,023,907 A | 6/1991 | Johnson et al. | |
| 5,047,928 A | 9/1991 | Wiedemer | |
| 5,050,213 A | 9/1991 | Shear | |
| 5,052,040 A | 9/1991 | Preston et al. | |
| 5,058,164 A | 10/1991 | Elmer et al. | |
| 5,103,476 A | 4/1992 | Waite et al. | |
| 5,113,519 A | 5/1992 | Johnson et al. | |
| 5,136,643 A | 8/1992 | Fischer | |
| 5,138,712 A | 8/1992 | Corbin | |
| 5,146,499 A | 9/1992 | Geffrotin | |
| 5,148,481 A | 9/1992 | Abraham et al. | |
| 5,159,182 A | 10/1992 | Eisele | |
| 5,183,404 A | 2/1993 | Aldous et al. | |
| 5,191,193 A | 3/1993 | Le Roux | |
| 5,204,897 A | 4/1993 | Wyman | |
| 5,222,134 A | 6/1993 | Waite et al. | |
| 5,235,642 A | 8/1993 | Wobber et al. | |
| 5,247,575 A | 9/1993 | Sprague et al. | |
| 5,255,106 A | 10/1993 | Castro | |
| 5,260,999 A | 11/1993 | Wyman | |
| 5,263,157 A | 11/1993 | Janis | |
| 5,263,158 A | 11/1993 | Janis | |
| 5,276,444 A | 1/1994 | McNair | |
| 5,276,735 A | 1/1994 | Boebert et al. | |
| 5,291,596 A | 3/1994 | Mita | |
| 5,301,231 A | 4/1994 | Abraham et al. | |
| 5,311,591 A | 5/1994 | Fischer | |
| 5,319,705 A | 6/1994 | Halter et al. | |
| 5,337,357 A | 8/1994 | Chou et al. | |
| 5,339,091 A | 8/1994 | Yamazaki et al. | |
| 5,341,429 A | 8/1994 | Stringer et al. | |
| 5,347,579 A | 9/1994 | Blandford | |
| 5,381,526 A | 1/1995 | Ellson | |
| 5,394,469 A | 2/1995 | Nagel et al. | |
| 5,410,598 A | 4/1995 | Shear | |
| 5,412,717 A | 5/1995 | Fischer | |
| 5,428,606 A | 6/1995 | Moskowitz | |
| 5,432,849 A | 7/1995 | Johnson et al. | |
| 5,438,508 A | 8/1995 | Wyman | |
| 5,444,779 A | 8/1995 | Daniele | |
| 5,453,601 A | 9/1995 | Rosen | |
| 5,455,953 A | 10/1995 | Russell | |
| 5,457,746 A | 10/1995 | Dolphin | |
| 5,473,687 A | 12/1995 | Lipscomb et al. | |
| 5,473,692 A | 12/1995 | Davis | |
| 5,499,298 A | 3/1996 | Narasimhalu et al. | |
| 5,502,766 A | 3/1996 | Boebert et al. | |
| 5,504,814 A | 4/1996 | Miyahara | |
| 5,504,818 A | 4/1996 | Okano | |
| 5,504,837 A | 4/1996 | Griffeth et al. | |
| 5,509,070 A | 4/1996 | Schull | |
| 5,530,235 A | 6/1996 | Stefik et al. | |
| 5,532,920 A | 7/1996 | Hartrick et al. | |
| 5,534,975 A | 7/1996 | Stefik et al. | |
| 5,539,735 A | 7/1996 | Moskowitz | |
| 5,563,946 A | 10/1996 | Cooper et al. | |
| 5,568,552 A | 10/1996 | Davis | |
| 5,586,186 A | 12/1996 | Yuval et al. | |
| 5,600,721 A | * 2/1997 | Kitazato | 380/217 |
| 5,621,797 A | 4/1997 | Rosen | |
| 5,629,980 A | 5/1997 | Stefik et al. | 380/4 |
| 5,633,932 A | 5/1997 | Davis et al. | |
| 5,634,012 A | 5/1997 | Stefik et al. | 395/239 |
| 5,638,443 A | 6/1997 | Stefik et al. | 380/4 |
| 5,649,013 A | 7/1997 | Stuckey et al. | |
| 5,655,077 A | 8/1997 | Jones et al. | |
| 5,708,717 A | 1/1998 | Alasia | |
| 5,715,403 A | 2/1998 | Stefik | 395/244 |
| 5,734,823 A | 3/1998 | Saigh et al. | |
| 5,734,891 A | 3/1998 | Saigh | |
| 5,737,413 A | 4/1998 | Akiyama et al. | |
| 5,737,416 A | 4/1998 | Cooper et al. | |
| 5,745,569 A | 4/1998 | Moskowitz et al. | |
| 5,748,783 A | 5/1998 | Rhoads | |
| 5,757,907 A | 5/1998 | Cooper et al. | |
| 5,761,686 A | 6/1998 | Bloomberg | |
| 5,765,152 A | 6/1998 | Erickson | |
| 5,768,390 A | 6/1998 | Coppersmith et al. | |
| 5,768,426 A | 6/1998 | Rhoads | |
| 5,825,892 A | 10/1998 | Braudaway et al. | |
| 5,867,579 A | * 2/1999 | Saito | 705/57 |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,940,504 A | 8/1999 | Griswold | |
| 5,943,422 A | 8/1999 | Van Wie et al. | |
| 5,949,876 A | 9/1999 | Ginter et al. | |
| 5,982,891 A | 11/1999 | Ginter et al. | |
| 5,991,403 A | * 11/1999 | Aucsmith et al. | 380/217 |
| 5,995,625 A | 11/1999 | Sudia et al. | |
| 5,999,949 A | 12/1999 | Crandall | |
| 6,006,004 A | * 12/1999 | Moriyama et al. | 386/46 |
| 6,011,905 A | * 1/2000 | Huttenlocher et al. | 358/1.2 |
| 6,044,157 A | * 3/2000 | Uesaka et al. | 380/201 |
| 6,047,067 A | 4/2000 | Rosen | |
| 6,112,181 A | 8/2000 | Shear et al. | |
| 6,115,471 A | 9/2000 | Oki et al. | |
| 6,138,119 A | 10/2000 | Hall et al. | |
| 6,157,721 A | 12/2000 | Shear et al. | |
| 6,185,683 B1 | 2/2001 | Ginter et al. | |
| 6,192,138 B1 | * 2/2001 | Yamadaji | 382/100 |
| 6,226,618 B1 | 5/2001 | Downs et al. | |
| 6,233,684 B1 | * 5/2001 | Stefik et al. | 713/176 |
| 6,236,727 B1 | * 5/2001 | Ciacelli et al. | 380/212 |
| 6,236,971 B1 | * 5/2001 | Stefik et al. | 705/1 |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,301,660 B1 | 10/2001 | Benson | |
| 6,327,652 B1 | 12/2001 | England et al. | |
| 6,330,670 B1 | 12/2001 | England et al. | |
| 6,345,256 B1 | 2/2002 | Milsted et al. | |
| 6,363,488 B1 | 3/2002 | Ginter et al. | |
| 6,389,402 B1 | 5/2002 | Ginter et al. | |
| 6,424,715 B1 | * 7/2002 | Saito | 380/201 |

FOREIGN PATENT DOCUMENTS

| | | |
|---|---|---|
| EP | 0 651 554 | 5/1995 |
| EP | 0 668 695 | 8/1995 |
| EP | 0 725 376 | 8/1996 |
| EP | 0 878 796 | 11/1998 |
| EP | 0 932 298 | 7/1999 |
| GB | 2 136 175 | 9/1984 |
| GB | 2 236 604 | 4/1991 |
| JP | 62-241061 | 10/1987 |
| JP | 64-068835 | 3/1989 |
| JP | 04-369068 | 12/1992 |
| JP | 05-268415 | 10/1993 |
| JP | 06-175794 | 6/1994 |

| | | |
|---|---|---|
| JP | 06-215010 | 8/1994 |
| JP | 07-084852 | 3/1995 |
| JP | 07-200317 | 8/1995 |
| JP | 07-244639 | 9/1995 |
| JP | 0 715 241 | 6/1996 |
| WO | WO 92/20022 | 11/1992 |
| WO | WO 93/01550 | 1/1993 |
| WO | WO 94/01821 | 1/1994 |
| WO | 96 24092 | 8/1996 |
| WO | WO 96/24092 | 8/1996 |
| WO | WO 97/48203 | 12/1997 |
| WO | WO 98/11690 | 3/1998 |
| WO | WO 98/42098 | 9/1998 |
| WO | 99 16205 | 4/1999 |
| WO | WO 99/49615 | 9/1999 |
| WO | 00 14918 | 3/2000 |
| WO | WO 01/63528 | 8/2001 |

OTHER PUBLICATIONS

Cryptolopes. http://www.software.ibm.com/security/cyrptolope/.

Jstream's WiredWrite. http://www.jstream.com.

Olin Sibert, O., Bernstein, D. and Van Wie, D., "Securing the Content, Not the Wire, for Information Commerce". http://www.intertrust.com/star/secure-the-content.html.

Xerox's Digipaper. http://parcweb.parc.xerox.com/spl/projects/digipaper/.

Ramanujapuram et al., "Digital Content & Intellectual Property Rights" Dr. Dobb's Journal, Dec. 1998, vol. 23, No. 12, pp. 20–22, 24, 26–27.

"National Semiconductor and EPR Partner for Information Metering/Data Security Cards" Mar. 4, 1994, Press Release from Electronic Publishing Resources, Inc.

Weber, R., "Digital Rights Management Technology" Oct. 1995.

Flasche, U. et al., "Decentralized Processing of Documents", pp. 119–131, 1986, Comput. & Graphics, vol. 10, No. 2.

Mori, R. et al., "Superdistribution: The Concept and the Architecture", pp. 1133–1146, 1990, The Transactions of the IEICE, vol. E 73, No. 7, Tokyo, JP.

Weber, R., "Metering Technologies for Digital Intellectual Property", pp. 1–29, Oct. 1994, A Report to the International Federation of Reproduction Rights Organizations.

Clark, P.C. et al., "Bits: A Smartcard protected Operating System", pp. 66–70 and 94, Nov. 1994, Communications of the ACM, vol. 37, No. 11.

Ross, P.E., "Data Guard", pp. 101, Jun. 6, 1994, Forbes.

Saigh, W.K., "Knowledge is Sacred", 1992, Video Pocket/Page Reader Systems, Ltd.

Kahn, R.E., "Deposit, Registration and Recordation in an Electronic Copyright Management System", pp. 1–19, Aug. 1992, Corporation for National Research Initiatives, Virginia.

Hilts, P. et al., "Books While U Wait", pp. 48–50, Jan. 3, 1994, Publishers Weekly.

Strattner, A, "Cash Register on a Chip may Revolutionize Software Pricing and Distribution; Wave Systems Corp.", pp. 62, Apr. 1994, Computer Shopper, vol. 14, No. 4, ISSN 0886-0556.

O'Conner, M., "New Distribution Option for Electronic Publishers; iOpener Data Encryption and Metering System for CD-ROM use; Column", pp. 134, Mar. 1994, CD-ROM Professional, vol. 7, No. 2, ISSN: 1409-0833.

Willett, S., "Metered PCs: Is Your System Watching You? Wave System beta tests new technology", pp. 84, May 2, 1994, InfoWorld.

Linn, R., "Copyright and Information Services in the Context of the National Research and Education Network", pp. 9–20, Jan. 1994, IMA Intellectual Property Project Proceedings, vol. 1, Issue 1.

Perrit, Jr., H., "Permission Headers and Contract Law", pp. 27–48, Jan. 1994, IMA Intellectual Property Project Proceedings, vol. 1, Issue 1.

Upthegrove, L., "Intellectual Property Header Descriptions: A Dynamic Approach", pp. 63–66, Jan. 1994, IMA Intellectual Property Proceedings, vol. 1, Issue 1.

Sirbu, M., "Internet Billing Service Design and prototype Implementation", pp. 67–80, Jan. 1994, IMA Intellectual Property Project Proceedings, vol. 1, Issue 1.

Simmel, S. et al., "Metering and Licensing of Resources: Kala's General Purpose Approach", pp. 81–110, Jan. 1994, IMA Intellectual Property Project Proceedings, vol. 1, Issue 1.

Kahn, R., "Deposit, Registration and Recordation in an Electronic Copyright Mangement System", pp. 111–120, Jan. 1994, IMA Intellectual Property Project Proceedings, vol. 1, Issue 1.

Tygar, J. et al., "Dyad: A System for Using Physically Secure Coprocessors", pp. 121–152, Jan. 1994, IMA Intellectual Property Project Proceedings, vol. 1, Issue 1.

Griswold, G., "A Method for Protecting Copyright on Networks", pp. 169–178. Jan. 1994, IMA Intellectual Property Project Proceedings, vol. 1, Issue 1.

Nelson, T., "A Publishing and Royalty Model for Networked Documents", pp. 257–259, Jan. 1994, IMA Intellectual Property Project Proceedings, vol. 1, Issue 1.

Robinson, E., "Redefining Mobile Computing", pp. 238–240, 247–248 and 252, Jul. 1993, PC Computing.

Abadi, M. et al., "Authentication and Delegation with Smart-cards", 1990, Research Report DEC Systems Research Center.

Mark Stefik, "Letting Loose the Light: Igniting Commerce in Electronic Publication", pp. 219–253, 1996, Internet Dreams: Archetypes, Myths, and Metaphors, IDSN 0-262-19373-6.

Mark Stefik, "Letting Loose the Light: Igniting Commerce in Electronic Publication", pp. 2–35, Feb. 8, 1995, Internet Dreams: Archetypes, Myths and Metaphors.

* cited by examiner the document company xerox

Figure 11

| identifier | 1000 | 1001 | 101 | 0100 | 000 | 001 | 0101 | 011 | 1101 | 11000 | 11001 | 11100 | 1111 | 11101 |
|---|---|---|---|---|---|---|---|---|---|---|---|---|---|---|
| token | t | h | e | d | o | c | u | m | n | p | a | y | x | r |

Figure 12

| identifier | 1000 | 1001 | 101 | 0100 | 000 | 001 | 0101 | 011 | 1101 | 101 | 11000 | 11001 | 11100 | 1111 | 000 | 011 |
|---|---|---|---|---|---|---|---|---|---|---|---|---|---|---|---|---|
| x | 10 | 10 | 10 | 20 | 10 | 10 | 10 | 10 | 10 | 10 | 10 | 10 | 20 | 10 | 10 | 10 |
| y | 10 | 0 | 0 | 0 | 0 | 0 | 0 | 0 | 0 | 0 | 0 | 0 | 0 | 0 | 0 | 0 |
| identifier | 11000 | 11001 | 1101 | 11100 | 1111 | 101 | 11101 | 011 | 1101 | 1111 | | | | | | |
| x | 10 | 10 | 10 | 10 | 20 | 10 | 10 | 10 | 10 | 10 | | | | | | |
| y | 0 | 0 | 0 | 0 | 0 | 0 | 0 | 0 | 0 | 0 | | | | | | |

Figure 13

| Page | Control | Resource | Control | Data | Control | Data | ... |

Figure 18

```
<html>
<body>
<font name="Arial" size="14">
Hello World
</font>
<p>
</body>
</html>
```

Figure 19

```
<html>
<body>
<font name="kl3k2" size="21">
v0aa 8 aa0
</font>
<p>
</body>
</html>
```

| ResID | Characteristics |
|---|---|
| ElemID | |

... | ElemID | Characteristics |

| Arial | 'a' |
|---|---|
| 48 | |

| k13k2 | 'Y' |
|---|---|
| 48 | |

SYSTEM AND METHOD FOR PROTECTION OF DIGITAL WORKS

RELATED APPLICATION

This application is a continuation-in-part application of application Ser. No. 09/178,529 filed Oct. 23, 1998, now U.S. Pat. No. 6,519,700.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

This invention relates to document rights management, and more particularly, to a method for protecting digital works which employs format-preserving encryption that enables blind transformations.

BACKGROUND OF THE INVENTION

One of the most important issues impeding the widespread distribution of digital documents or works via electronic commerce is the current lack of protection of the intellectual property rights of content owners during the distribution and use of those digital documents or works. Efforts to resolve this problem have been termed "Intellectual Property Rights Management" ("IPRM"), "Digital Property Rights Management" ("DPRM"), "Intellectual Property Management"("IPM"), "Rights Management" ("RM"), "Digital Rights Management" ("DRM") and "Electronic Copyright Management" ("ECM"). At the core of Digital Rights Management is the underlying issue of ensuring that only authorized users may perform operations on digital documents or works that they have acquired. Once accessed, the content must not be distributed or used in violation of the content owner's specification of rights.

A document or work, as the term is used herein, is any unit of information subject to distribution or transfer, including but not limited to correspondence, books, magazines, journals, newspapers, other papers, software, photographs and other images, audio and video clips, and other multimedia presentations. A document may be embodied in printed form on paper, as digital data on a storage medium, or in any other known manner on a variety of media. A digital work, as the term is used herein, is any document, text, audio, multimedia or other type of work or portion thereof maintained in a digital form that can be replayed or rendered using a device or a software program.

In the world of printed documents, a work created by an author is usually provided to a publisher, which formats and prints numerous copies of the work. The copies are then sent by a distributor to bookstores or other retail outlets, from which the copies are purchased by end users.

While the low quality of copying and the high cost of distributing printed material have served as deterrents to the illegally copying of most printed documents, it is far too easy to copy, modify, and redistribute unprotected electronic documents. Accordingly, some method of protecting electronic documents is necessary to make it harder to illegally copy them. This will serve as a deterrent to copying, even if it is still possible, for example, to make hardcopies of printed documents and duplicate them the old-fashioned way.

With printed documents, there is an additional step of digitizing the document before it can be redistributed electronically; this serves as a deterrent. Unfortunately, it has been widely recognized that there is no viable way to prevent people from making unauthorized distributions of electronic documents within current general-purpose computing and communications systems such as personal computers, workstations, and other devices connected over local area networks (LANs), intranets, and the Internet. Many attempts to provide hardware-based solutions to prevent unauthorized copying have proven to be unsuccessful.

Two basic schemes have been employed to attempt to solve the document protection problem: secure containers (systems which rely on cryptographic mechanisms) and trusted systems.

Cryptographic mechanisms encrypt (or "encipher") documents that are then distributed and stored publicly, and ultimately privately decrypted by authorized users. Cryptographic mechanisms provide a basic form of protection during document delivery from a document distributor to an intended user over a public network, as well as during document storage on an insecure medium. Many digital rights management solutions rely on encrypting the digital work and distributing both the encrypted message and decryption key to the consumer's system. While different schemes are employed to hide the decryption key from the consumer, the fact remains that all necessary information is available for a malicious user to defeat the protection of the digital work. Considering that current general-purpose computers and consumer operating systems provide little in the way of sophisticated security mechanisms, the threat is both real and obvious.

A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as IBM's Cryptolopes and InterTrust's Digiboxes fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

Cryptographic mechanisms and secure containers focus on protecting the digital work as it is being transferred to the authorized user/purchaser. However, a digital work must be protected throughout its use from malicious users and malicious software programs. Even if a user is a trusted individual the user's system may be susceptible to attack. A significant problem facing electronic commerce for digital works is ensuring that the work is protected on the target consumer's device. If the protection for the digital work is compromised, valuable and sensitive information is lost. To complicate matters, today's general-purpose computers and consumer operating systems are deficient in the areas of security and integrity. Protecting the work throughout usage is a much more complex issue that remains largely unsolved.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper proof trusted systems is still a real challenge to existing technologies, current market trends suggest that open and untrusted systems such as PC's and workstations will be the dominant systems used to access copyrighted documents. In this sense, existing computing environments such as PC's and workstations equipped with popular operating systems (e.g., Windows and UNIX) and render applications (e.g., Microsoft Word) are not trusted systems and cannot be made trusted without significantly altering their architectures.

Accordingly, although certain trusted components can be deployed, users must continue to rely upon various unknown and untrusted elements and systems. On such systems, even if they are expected to be secure, unanticipated bugs and weaknesses are frequently found and exploited.

Conventional symmetric and asymmetric encryption methods treat messages to be encrypted as basically binary strings. Applying conventional encryption methods to documents has some drawbacks. Documents are typically relatively long messages; encrypting long messages can have a significant impact on the performance of any application that needs to decrypt the document prior to use. More importantly, documents are formatted messages that rely on appropriate rendering applications to display, play, print and even edit therein. Since encrypting a document generally destroys formatting information, most rendering applications require the document be decrypted into clear form before rendering it. Decryption prior to rendering opens the possibility of disclosing the document in the clear after the decryption step to anyone who wants to intercept it.

There are a number of issues in rights management authentication authorization, accounting, payment and financial clearing, rights specification, rights verification, rights enforcement, and document protection. Document protection is a particularly important issue. After a user has honored the rights of the content owner and has been permitted to perform a particular operation with a document (e.g., print it, view it on-screen, play the music, or execute the software), the document is presumably in-the-clear, or unencrypted. Simply stated, the document protection problem is to prevent the content owner's rights from being compromised when the document is in its most vulnerable state: stored, in the clear, on a machine within the user's control.

Even when a document is securely delivered (typically in encrypted form) from a distributor to the user, it must be rendered to a presentation data form before the user can view or otherwise manipulate the document. Accordingly, to achieve the highest level of protection, it is important to protect the document contents as much as possible, while revealing them to the user at a late stage and in a form that is difficult to recover into a useful form.

In the known approaches to electronic document distribution that employ encryption, an encrypted document is rendered in several separate steps. First, the encrypted document is received by the user. Second, the user employs his private key (in a public key cryptosystem) to decrypt the data and derive the document's clear content. Finally, the clear content is then passed on to a rendering application, which translates the computer-readable document into the finished document, either for viewing on the user's computer screen or for printing a hardcopy. The clear content is required for rendering because, in most cases, the rendering application is a third-party product (such as Microsoft Word or Adobe Acrobat Reader) that requires the input document to be in a specific format. It should be appreciated, then, that between the second and third steps, the previously protected document is vulnerable. It has been decrypted, but is still stored in clear electronic form on the user's computer. If the user is careless or is otherwise motivated to minimize fees, the document may be easily redistributed without acquiring the necessary permissions from the content owner.

While no system is completely spoof proof or immune to attack, some recent techniques protect digital works by limiting use of the digital work to a user-specified physical device. These techniques require the user to provide private information or system state information from the system or physical device the user intends to use to render the digital work. System state information is typically defined as system configuration information such as system parameters, CPU identifier, device identifiers, NIC identifiers, drive configuration, etc. In these techniques, the digital content is encrypted using a session key, then the session key, rather than using the user's encryption key, is encrypted using a combination of the system or state information and the user's credential. Then both the encrypted content and key are transmitted to the destination repository. In order to use the received encrypted work, the user must contact a trusted authorizing entity (usually a remotely located software program) which verifies the user's identity and credentials, then together with system state, decrypts the session key and finally decrypts the content for use.

Commercial applications such as the secure Adobe Acrobat reader and the secure Microsoft MediaPlayer validate usage of the digital work by checking a license voucher for the appropriate user credentials and usage rights. Among the user credentials are system device identifiers such as the CPU identifier or certain device serial numbers. At the time the user invokes an operation on the digital work, the application verifies if the specified device is present. This provides assurance that the digital work has not been transmitted to an unauthorized user (actually to an unauthorized device). While the programmatic check provides a minimal level of assurance, it depends on the security of the secret, which resides on the user's device. Not only can the decryption key be violated, but also the device identifiers themselves are particularly susceptible to the threat of spoofing.

The Acrobat Reader and MediaPlayer protection schemes operate by allowing the rendering application to identify required devices on the user system as signified in the license voucher issued for the digital work. This provides a level of protection adequate in many circumstances (i.e., if the user is trusted and the user's specified rendering device is not susceptible to attack). The weakness of the schemes is that it is based on the assumption that neither the protection of the cryptographic key nor the integrity of the license voucher will be compromised.

These techniques are really more of an authentication technique than a protection technique, in that once the user's identity and credential information, system state information is verified or license voucher received, the content is decrypted to its clear state and then becomes vulnerable to attack. The digital work is afforded no protection throughout usage. Further, the user information approach is problematic in that it assumes the user will be sufficiently deterred from passing along his/her personal information. In other words, for the user information approach to succeed there must be severe consequences for users who would reveal their private identity and credential information.

A significant drawback to the schemes which tie authorization a specific device is that they require the user to divulge sensitive information (e.g., CPU number or other personal information) which raises a concern regarding privacy issues. While the user divulges the information voluntarily (the user's only option if he/she does not wish to divulge this information is not to receive the digital work) it would be desirable to provide a protection scheme that could secure a digital work on a user's device without requiring private information. It would also be desirable to provide a DRM solution which does not rely on the protection of the cryptographic key or the integrity of the license voucher. It would be desirable to provide a DRM solution which delayed decryption of the digital content to the latest possible moment.

Accordingly, it would be beneficial to provide an electronic document distribution scheme that minimizes the disadvantages of known systems. Such a scheme would prevent users from obtaining a useful form of an electronically-distributed document during the decryption and rendering processes.

SUMMARY OF THE INVENTION

A self-protecting document ("SPD"), according to the invention, is not subject to the above-stated disadvantages of the prior art. By combining an encrypted document with a set of permissions and an executable code segment that includes most of the software necessary to extract and use the encrypted document, the self-protecting document accomplishes protection of document contents without the need for additional hardware and software.

The SPD system is broken down between a content creator (analogous to the author and the publisher of the traditional model) and a content distributor. The author/publisher creates the original document, and decides what rights are to be permitted. The distributor then customizes the document for use by various users, ensuring via the customization that the users do not exceed the permissions they purchased.

At the user's system, the self-protecting document is decrypted at the last possible moment. In an embodiment of the invention, various rendering facilities are also provided within the SPD, so that the use of the SPD need not rely upon external application that might not be trustworthy (and that might invite unauthorized use). In an alternative embodiment, interfaces and protocols are specified for a third-party rendering application to interact with the SPD to provide trusted rendering.

In one embodiment of the invention, the encrypted document is decrypted by the user's system while simultaneously "polarizing" it with a key that is dependent, at least in part, on the state of the user's system. The polarization may be cryptographically less secure than the encryption used for distribution, but serves to deter casual copying. In this embodiment, depolarization is performed during or after the rendering process, so as to cause any intermediate form of the document to be essentially unusable.

In another embodiment of the invention, a method of protecting a digital work uses a blind transformation function to transform an encrypted digital work into encrypted presentation data. The originator's digital content is protected in its original form by not being decrypted. This method enables the rendering or replay application to process the encrypted document into encrypted presentation data without decrypting it first. Encrypted presentation data is then decrypted just before it is displayed to the user. This method improves the overall performance of the process (both decryption and rendering) by minimizing the decryption overhead (since pre-rendering decryption is generally more time and resource consuming) and postponing the decryption to a late stage of the rendering process.

Blind transformation or blind computing can be accomplished in one of several ways. Most digital works include formatting information, which when encrypted cannot be processed by the replay or rendering application (the transformation function which transforms a digital work into presentation data). If the digital work is encrypted with a format preserving encryption scheme, any transformation function may be used. This is particularly useful in that any commercial replay or rendering application can process the encrypted digital work into encrypted presentation data. Otherwise, the blind transformation function is a function of the original transformation function. For example, the blind transformation function may be a polynomial of the original transformation function. Alternatively, both the blind transformation function and the original transformation function may be any multivariate, integer coefficient affine function.

Not all encryption schemes are format preserving encryption schemes. Additive encryption schemes may be used with all document types and all associated transformation functions. In some replay or render applications, for some types of documents, portions of the format information may be left in the clear. In other types of documents all of the format information may be encrypted. In some types of documents, an additive encryption scheme may be used to encrypt the format information and any encryption scheme may be used to encrypt the content or data portion of the document.

In particular, additive encryption schemes can be used to encrypt coordinate information of documents so that some rendering transformations can be performed on the encrypted coordinate data. In a special class of documents, token-based documents, for example, there are two places during the format-preserving encryption that use encryption schemes: one is for coordinate or location information x and y of the particular tokens within the document, and the other is for the dictionary of individual token images. In order to perform blind transformation on the individual coordinates of the particular tokens in the document, the first encryption scheme must be an additive encryption scheme. However, the token dictionary may be encrypted with any encryption scheme.

An encrypted token dictionary may still leak information such as the sizes of the token images. If this is a concern (such as if the token dictionary is small), the tokens can be padded with some extra bits before encryption. The padding can result in encrypted token images of a same size or several fixed sizes. For a token-based document, the coordinate information of the tokens in the dictionary may not be encoded. If it is desired that coordinate information be encoded, say, as Huffman codewords, the same approach that is used to encrypt the identifiers can be used to deal with this situation. Basically, the codewords in location tables are left in the clear, and the codewords in the codeword dictionary are hashed using some one-way hash function and their corresponding coordinate information is encrypted. During rendering the codewords in the location tables are first hashed and then used to lookup their encrypted coordinate information.

In another embodiment of the invention, a digital work and a system context (or resource information or system resource) are polarized enabling trusted rendering or replay of the digital work without depolarization of the digital content. In this embodiment, the digital work is of the type which includes digital content and resource information. Resource information may include information used by a replay application to format or process the digital work into presentation data. Resource information may include, for example, a collection of system resources available to the replay software on a particular system, such as the Font Table, Color Palette, System Coordinates and Volume Setting.

Different types of digital works may be polarized. In addition to polarizing typical document type digital works, audio and video digital works can be polarized. The digital work and system context are usually polarized at a manufacturer or content owner's location using a polarization engine. A polarization engine is a component used to transform the digital work and system context to their respective polarized forms. The polarization engine employs a polarization scheme which relies on some polarization seed, an element used to initialize and customize the polarization engine.

Various polarization schemes may be used to polarize a digital work. For example, a stateless polarization employs a random number as a seed to transform a digital work into a polarized digital work. A state-based polarization scheme employs a seed based on a system state or characteristic of a system to transform a digital work into a polarized digital work that is associated with that system state or characteristic. A dynamic state-based polarization scheme employs a seed based on a dynamic system state or characteristic to transform a digital work into a polarized digital work. In this embodiment, the polarized digital work will typically be provided with a polarization engine for repolarizing the encoded digital work and the encoded system context according to the dynamic state-based polarization scheme each time the system requests replay of the digital work. An authorization-based polarization scheme employs a seed based on authorization information received from a trusted source to transform a digital work into a polarized digital work. For further security, the polarized system context can be stored separately from the polarized digital work in a removable context device, which must be coupled to the system prior to use of the digital work.

Preferably the polarization seed contains information which can be used to tie the particular digital work to the ultimate end user or an ultimate end user system. Typically the owner or distributor will select the type of polarization scheme to be used in polarizing the digital work and the type of polarization key to use depending on the value of the digital work. Like encryption schemes, polarization schemes come in different levels of complexity and strength. When a digital work is ordered, a copy of a portion of the digital work's resource information, called the system context, is made. The polarization seed is selected and both the digital work and the system context are polarized. A different polarization scheme may be used for the system context than is used for the digital work. However the polarization seed is the same for both. The polarized digital work and polarized system context are then provided to the user for replay or rendering on a replay or rendering system.

In the format preserving encryption and trusted rendering embodiment of the invention, protection is provided until the encrypted presentation data must be decrypted into clear presentation data. In this embodiment of the invention, the replay application uses the polarized resource information to transform a polarized digital work into clear presentation data.

If only the digital content of a digital work is polarized, leaving the resource information unpolarized or in the clear, the replay application will be able to process the polarized digital work into polarized presentation data. This means a depolarizer must depolarize the presentation data into clear presentation data suitable for viewing or use by the user. If a portion of a digital work's resource information is also polarized accordingly, when the replay application transforms the polarized digital work, the replay application uses the polarized system resource information to transform the polarized digital work into clear presentation data. All or just a portion of the required resource information may be polarized. The replay is blind in that the replay application does not see the original, unpolarized digital content.

In this embodiment, a polarized digital work is transformed by the replay application using a polarized system context (resource information) to create clear presentation data; the repay application can be any commercial or third party application. The replay application need not be customized to depolarize the presentation data and no depolarizer engine is required. The replay application operates as a blind replay system (it processes polarized digital content using polarized system resources) and relies on a type of polarization which transforms or encodes the digital work such that the ability to replay it using a software program or device is tied to a specific resource information, thus protecting the content throughout use.

Unlike systems which employ encryption to protect the digital work and eventually decrypt the digital work into its clear form before the digital work is provided to the replay application, the blind replay system keeps the digital work encoded in the polarized form (there is no explicit decoding step in the blind reply) until the last possible moment of the replay process. In the blind replay system, the polarized digital work itself is never depolarized in the clear. Since presentation data is generally of a lesser quality than the original digital work, even if the presentation data is captured in its clear form, it cannot be easily (if at all) transformed back into the original digital works.

Many different types of digital works and their resource information may be polarized and replayed in a blind replay system. Digital works such as documents, text, audio files, graphics files and video files may be replayed in the blind replay system of the invention by polarization of an appropriate resource information

BRIEF DESCRIPTION OF THE DRAWING

The structure and function of the invention is best understood with reference to the included drawings, which may be described as follows:

FIG. 11 is a simple example of a document to be tokenized;

FIG. 12 is the token dictionary for the document of FIG. 11;

FIG. 13 is the location table for the document of FIG. 11;

FIG. 18 is a block diagram of an example structure of a digital document;

FIG. 19 is an example digital document;

FIG. 20 is an example of the digital document of FIG. 16 after it has been polarized;

FIG. 21 is block diagram of an example structure of a resource information or system context for a digital document;

FIG. 22 is a block diagram of an example font table; and

FIG. 23 is block diagram of the font table of FIG. 22 after it has been polarized

DETAILED DESCRIPTION OF THE PREFERRED EMBODIMENTS

The invention is described below, with reference to detailed illusive embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
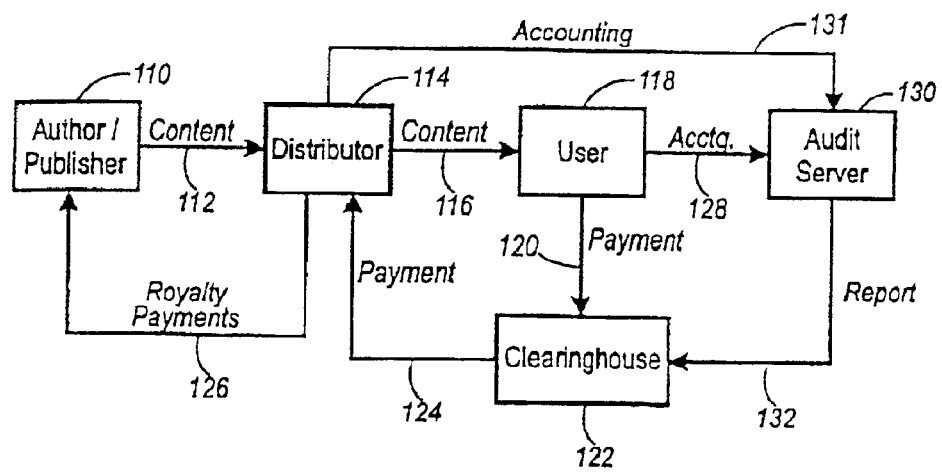
FIG. 1 is a top-level block diagram representing a model for the creation and commercial distribution of electronic documents in either secure or insecure environments.

FIG. 1 represents a top-level functional model for a system for the electronic distribution of documents, which as defined above, may include correspondence, books, magazines, journals, newspapers, other papers, software, audio and video clips, and other multimedia presentations.

An author (or publisher) 110 creates a document's original content 112 and passes it to a distributor 114 for distribution. Although it is contemplated that the author may also distribute documents directly, without involving another party as a distributor, the division of labor set forth in FIG. 1 is more efficient, as it allows the author/publisher 110 to concentrate on content creation, and not the mechanical and mundane functions taken over by the distributor 114. Moreover, such a breakdown would allow the distributor 114 to realize economies of scale by associating with a number of authors and publishers (including the illustrated author/publisher 110).

The distributor 114 then passes modified content 116 to a user 118. In a typical electronic distribution model, the modified content 116 represents an encrypted version of the original content 112; the distributor 114 encrypts the original content 112 with the user 118's public key, and modified content 116 is customized solely for the single user 118. The user 118 is then able to use his private key to decrypt the modified content 116 and view the original content 112.

A payment 120 for the content 112 is passed from the user 118 to the distributor 114 by way of a clearinghouse 122. The clearinghouse 122 collects requests from the user 118 and from other users who wish to view a particular document. The clearinghouse 122 also collects payment information, such as debit transactions, credit card transactions, or other known electronic payment schemes, and forwards the collected users' payments as a payment batch 124 to the distributor 114. Of course, it is expected that the clearinghouse 122 will retain a share of the user's payment 120. In turn, the distributor 114 retains a portion of the payment batch 124 and forwards a payment 126 (including royalties) to the author and publisher 110. In one embodiment of this scheme, the distributor 114 awaits a bundle of user requests for a single document before sending anything out. When this is done, a single document with modified content 116 can be generated for decryption by all of the requesting users. This technique is well-known in the art.

In the meantime, each time the user 118 requests (or uses) a document, an accounting message 128 is sent to an audit server 130. The audit server 130 ensures that each request by the user 118 matches with a document sent by the distributor 114; accounting information 131 is received by the audit server 130 directly from the distributor 114. Any inconsistencies are transmitted via a report 132 to the clearinghouse 122, which can then adjust the payment batches 124 made to the distributor 114. This accounting scheme is present to reduce the possibility of fraud in this electronic document distribution model, as well as to handle any time-dependent usage permissions that may result in charges that vary, depending on the duration or other extent of use.

The foregoing model for electronic commerce in documents, shown in FIG. 1, is in common use today. As will be shown in detail below, it is equally applicable to the system and method set forth herein for the distribution of self-protecting documents.

Figure 2:
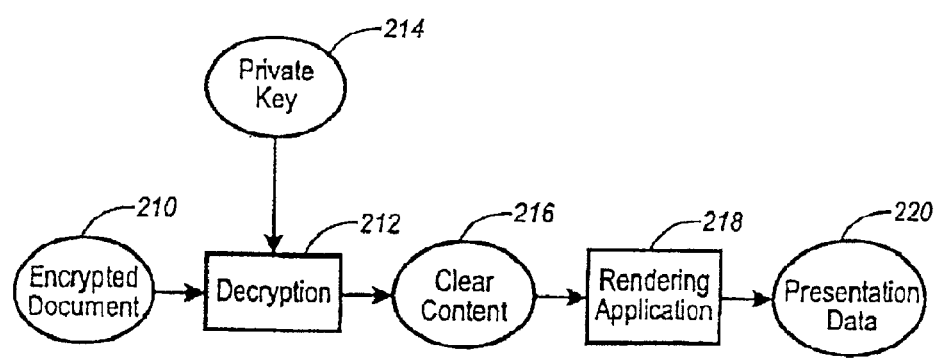
FIG. 2 is a flow diagram illustrating the decryption of protected electronic documents according to the art.

Turing now to FIG. 2, the steps performed by the user 118 (FIG. 1) in a prior art system for electronic document distribution are shown. As discussed above, cryptographic mechanisms are typically used to encipher documents. Those encrypted documents are then distributed and stored publicly and deciphered privately by authorized users. This provides a basic form of protection during document delivery from a document distributor to an intended user over a public network, as well as during document storage on an insecure medium.

At the outset, an encrypted document 210 is received by the user 118 and passed to a decryption step 212. As is well known in the art, the decryption step 212 receives the user 118's private key, which is stored locally at the user's computer or entered by the user when needed. The document 210 is decrypted resulting in clear content 216 similar or identical to the original content 112 (FIG. 1).

The clear content 216 is passed to a rendering application 218, which constructs presentation data 220, or a usable version of the document's original content 112. In typical systems of this kind, the presentation data 220 is data immediately suitable for display on a video screen, for printing as a hardcopy, or for other use depending on the document type.

As discussed above, the document is vulnerable in systems like this. The clear content 216 can be copied, stored, or passed along to other users without the knowledge or consent of the distributor 114 or the author/publisher 110. Even a legitimate user may be tempted to minimize the licensing fees by capturing the document in the clear in order to redistribute and use it at will, without honoring the intellectual property of the content owners. As discussed above, the present invention is directed to a scheme for preventing such a user from obtaining a useful form of the document during the rendering process on the user's system.

Accordingly, the system and method of the present invention sets forth an alternative scheme for handling encrypted document at the user 118's system. A simple embodiment of this scheme is illustrated in FIG. 3.

Figure 3:
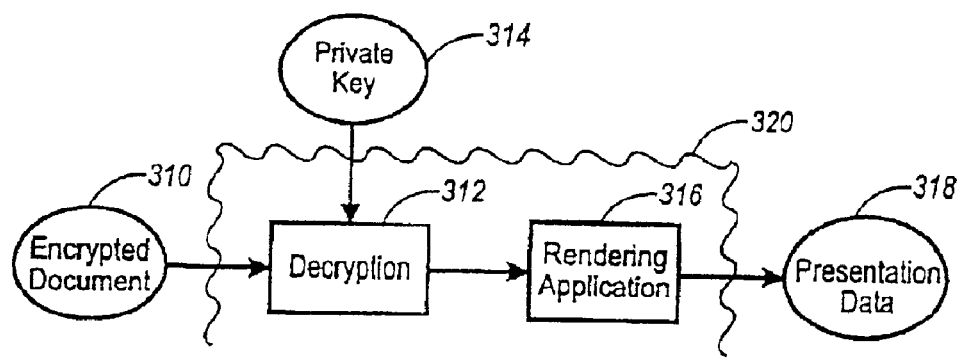
FIG. 3 is a flow diagram illustrating the decryption of protected electronic documents according to a simple embodiment of the invention.

FIG. 3 looks similar to FIG. 2, in that an encrypted document 310 is passed to a decryption step 312 (which uses a private key 314) and a rendering application 316, resulting in presentation data 318. However, an additional layer of protection is provided by a protecting shell 320. The protecting shell 320 allows the document 310 to be decrypted and rendered without ever leaving clear content (as in the clear content 216 of FIG. 2) available to be intercepted. This is accomplished by including decryption and rendering elements within the document 310, as will be described below with reference to FIG. 5. The included decryption and rendering elements are adapted to limit the user's interaction with the SPD, prohibiting certain operations (such as saving the document or performing cut-and-paste operations) according to the user's permissions.

Figure 4:
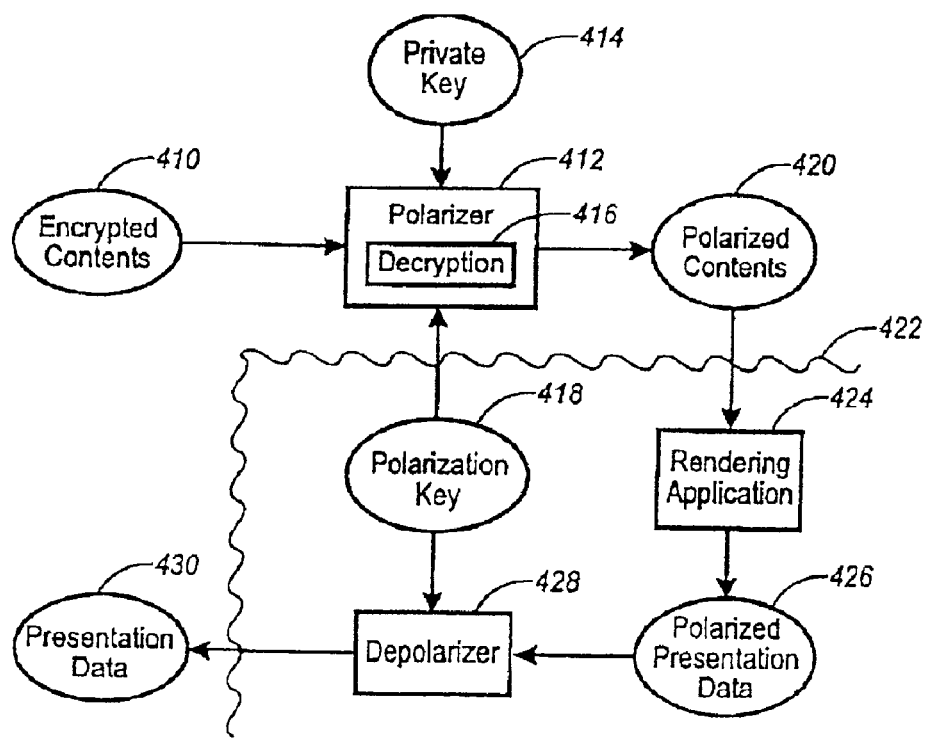
FIG. 4 is a flow diagram illustrating the decryption of protected electronic documents according to a preferred embodiment of the invention.

FIG. 4 is a more sophisticated version. The scheme of FIG. 4 includes an intermediate "polarization" step adapted to secure the document after it has been decrypted but before it is rendered. First, the encrypted document contents 410 are passed to a polarizer 412. The polarizer 412 receives the user's private key 414 and, via a decryption step 416, decrypts the document contents 410. Concurrently, the polarizer 412 receives a polarization key 418 from the user's system.

This polarization key 418 is used by the polarizer 412 to transform the document to a version having polarized contents 420. All of these operations can take place in the open, without any kind of protective mechanism, provided the polarizer 412 does not store a clear version of the document between decrypting it and polarizing it.

In one embodiment of the invention, the polarization key 418 represents a combination of data elements taken from the user's system's internal state, such as the date and time of day, elapsed time since the last keystroke, the processor's speed and serial number, and any other information that can be reputably derived from the user's system. It is useful to include some time-derived information in the polarization key 418 so that interception and seizure of polarized contents 420 would not be useful. Further rendering of the polarized document would not be possible, as the system time would have changed too much.

Then, once again within a protecting shell 422, the polarized contents 420 are passed to a rendering application 424. As discussed above, typical rendering applications are third-party applications such as Microsoft Word or Adobe Acrobat Reader. However, it is likely that such external rendering applications will not be able to process the polarized contents 420, as the contents, any formatting codes, and other cues used by the renderer will have been scrambled in the polarization process.

Hence, the rendering application 424 must be commutative (or at least fault-tolerant), or it must receive polarized contents 420 that are largely complete and processable by the application. The latter possibility will be discussed below, in connection with FIG. 9.

The output of the rendering application is polarized presentation data 426, which has been formatted by the rendering application 424 but is still polarized, and hence not readable by the user. The polarized presentation data 426 is passed to a depolarizer 428, which receives the polarization key 418 and restores the original form of the document as presentation data 430. In one embodiment of the invention, the depolarization function is combined with the rendering or display function. In this case, the polarized presentation data 426 is received directly by a display device, which can be separate from the user's system and receive data over a communications channel.

Creation of the polarization key 418, the rendering application 418, and the depolarization step 428 are all elements of the protecting shell 422; these are tamper-resistant program elements. It is contemplated that all computational (or transformation) steps that occur within the protecting shell 422 will use local data only, and will not store temporary data to any globally accessible storage medium or memory area; only the explicit results will be exported from the protecting shell 422. This approach will prevent users from easily modifying operating system entry points or scavenging system resources so as to intercept and utilize intermediate data.

It should be noted that the presentation data 430 of FIG. 4, in alternative embodiments of the invention, can be either device independent or device dependent. In the device-independent case, additional processing by a device driver (such as a display driver or a printer driver) typically is necessary to complete the rendering process. In the presently preferred device-dependent case, the device-specific modifications to the presentation data have already been made (either in the rendering application 424 or the depolarizing step 428), and the presentation data 430 can be sent directly to the desired output device.

Figure 5:
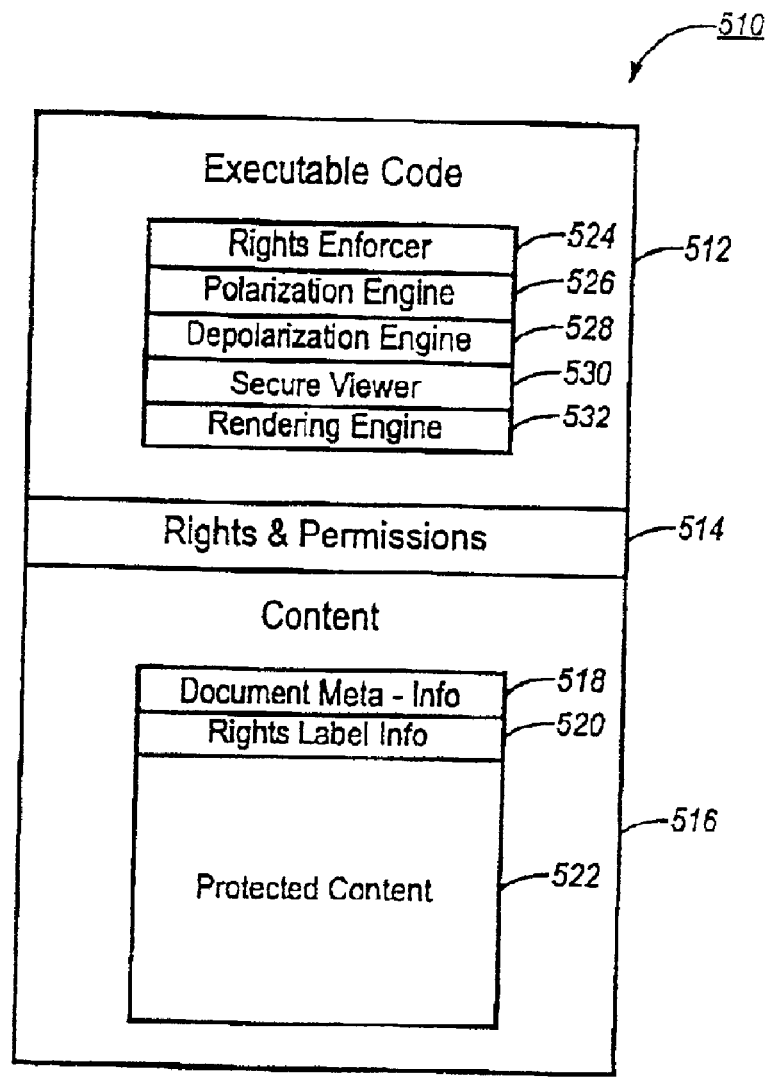
FIG. 5 is a functional block diagram illustrating the data structures present in a self-protecting document according to an embodiment of the invention.

The decryption schemes described with reference to FIGS. 3 and 4 above are enabled by a unique document structure, which is shown in detail in FIG. 5. As discussed above, certain operations performed by the system and method of the invention require trusted components. One way to ensure that certain unmodified code is being used to perform the trusted aspects of the invention is to provide the code along with the documents. The various components of a self-protecting document according to the invention are illustrated in FIG. 5.

The problem of document protection is approached by the invention without any assumptions on the presence of trusted hardware units or software modules in the user's system. This is accomplished by enhancing a document to be an active meta-document object. Content owners (i.e., authors or publishers) attach rights to a document that specify the types of uses, the necessary authorizations and the associated fees, and a software module that enforces the permissions granted to the user. This combination of the document, the associated rights, and the attached software modules that enforce the rights is the self-protecting document ("SPD") of the invention. A self-protecting document prevents the unauthorized and uncontrolled use and distribution of the document, thereby protecting the rights of the content owners.

The self-protecting document 510 includes three major functional segments: an executable code segment 512 contains certain portions of executable code necessary to enable the user to use the encrypted document; a rights and permissions segment 514 contains data structures representative of the various levels of access that are to be permitted to various users; and a content segment 516 includes the encrypted content 116 (FIG. 1) sought to be viewed by the user.

In a preferred embodiment of the invention, the content segment 516 of the SPD 510 includes three subsections: document meta-information 518 (including but not limited to the document's title, format, and revision date), rights label information 520 (such as a copyright notice attached to the text, as well as rights and permissions information), and the protected content 520 (the encrypted document itself).

In one embodiment of the invention, the rights and permissions segment 514 includes information on each authorized user's specific rights. A list of terms and conditions may be attached to each usage right. For example, user John Doe may be given the right to view a particular document and to print it twice, at a cost of $10. In this case, the rights and permissions segment 514 identifies John Doe, associates two rights with him (a viewing right and a printing right), and specifies terms and conditions including the price ($10) and a limitation on printing (twice). The rights and permissions segment 514 may also include information on other users.

In an alternative embodiment, the rights and permissions segment 514 includes only a link to external information specifying rights information. In such a case, the actual rights and permissions are stored elsewhere, for example on a networked permission server, which must be queried each time the document is to be used. This approach provides the advantage that rights and permissions may be updated dynamically by the content owners. For example, the price for a view may be increased, or a user's rights may be terminated if unauthorized use has been detected.

In either scenario, the rights and permissions segment 514 is cryptographically signed (by methods known in the art) to prevent tampering with the specified rights and permissions; it may also be encrypted to prevent the user from directly viewing the rights and permissions of himself and others.

The executable code segment 512, also called the "SPD Control," also contains several subsections, each of which comprises a software module at least partially within the executable code segment. In one embodiment of the invention, the Java programming language is used for the SPD Control; however, it is contemplated that any platform-independent or platform-specific language, either interpreted or compiled, can be used in an implementation of this invention.

A rights enforcer 524 is present to verify the user's identity, to compare a requested action by the user to those actions enumerated in the rights and permissions segment 514, and to permit or deny the requested action depending on the specified rights. The operation of the rights enforcer 524 will be discussed in further detail below, in connection with FIG. 7.

A secured polarization engine 526 is also present within the executable code segment 512; it serves to read and polarize the data according to the system state (or other polarization key) as discussed above. In a preferred embodiment of the invention, the polarization engine 526 acts upon the document before it is stored or decrypted, so the document is never stored in the clear on the user's system. The polarization engine 526 is secured, that is, it is cryptographically signed and encrypted, to prevent tampering, reverse-engineering, and disassembling.

A counterpart depolarization engine 528 is also included to enable the generation of clear presentation data from the polarized content (see FIG. 4). The depolarization engine includes a set of secure window objects, providing a relatively tamper-proof interface to the rendering API (application program interface) of the user's system. The secure window objects are resistant to being intercepted, thereby reducing the possibility that the document, in its clear form, can be reconstructed by intercepting and receiving the data intended for the operating system.

A counterpart depolarization engine 528 is also included to enable the generation of clear presentation data from the polarized content (see FIG. 4). The depolarization engine 528 provides a relatively tamper-proof interface to the logical or physical output device (e.g., the user's display device). The input to the depolarization engine 528 is polarized presentation data. Therefore, if that data is intercepted, it will not reveal any of the clear content without further depolarization which depends on, for example, the user's system state.

A secure viewer 530 is optionally included in the executable code segment 512. The secure viewer 530 is used to permit only those levels of access that are permitted according to the rights and permissions segment 514. For example, if the user purchased only sufficient rights to view a document (and not to save or print it), the viewer will not permit the user to save, print, or perform the standard cut-and-paste operations possible in most modern operating systems.

Finally, a rendering engine 532 is included or referenced within the executable code segment 512. The rendering engine 532 need not be secure. Accordingly, the code for the rendering engine 532 can be included within the SPD applet, or alternatively retrieved (via a secure link) from some other location. In either case, the rendering engine 532 is adapted to receive polarized document contents and produced polarized presentation data therefrom (see FIG. 4).

The foregoing aspects and elements of the self-protecting document 510 will be discussed in further detail below, in conjunction with the operation of the system.

Figure 6:
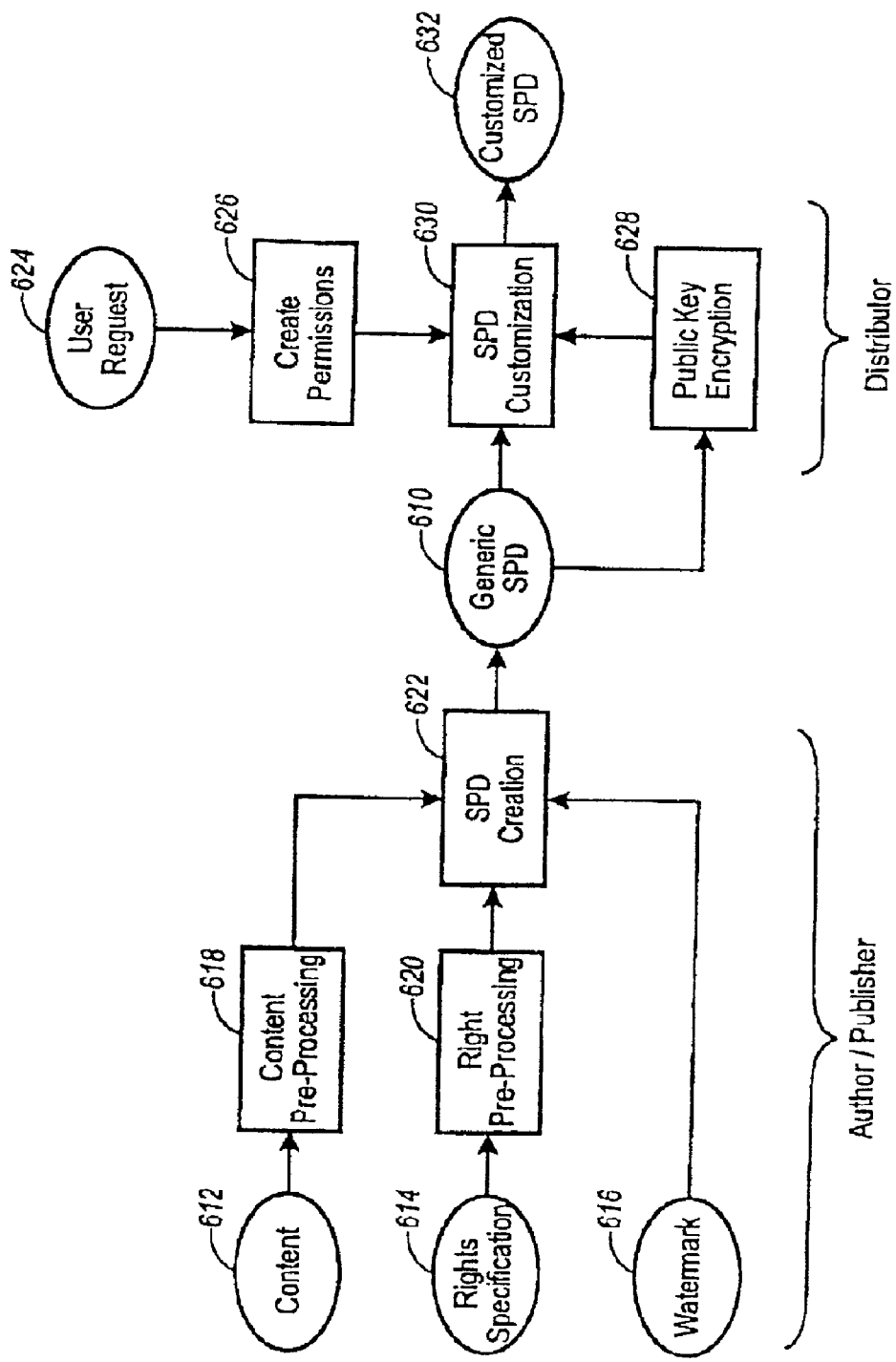
FIG. 6 is a flow diagram illustrating the creation and customization of a self-protecting document according to an embodiment of the invention.

FIG. 6 shows the steps performed when a self-protecting document 510 is created and distributed. A generic SPD 610 includes no user-specific rights information and is not encrypted for any particular user. The generic SPD 610 is created from three items: the original document content 612, in clear (unencrypted) form; a high-level rights specification 614; and an optional watermark 616.

The content 612 is pre-processed (step 618) to lay out the document as desired by the author or publisher. For example, a preferred page size, font, and page layout may be selected. The content 612 is essentially "pre-rendered" in the content pre-processing step so that it will be in a format that is compatible with users' systems and the SPD. For example, the content 612 may be converted from Microsoft Word (".DOC") or Adobe Acrobat (".PDF") format to a different format specially adapted to be read by the rendering engine 532 (FIG. 5). In one embodiment of the invention, multiple versions of the content 612 are generated by the content preprocessing step and stored in the generic SPD 610; those different versions may then be separately purchased by the user according to his needs.

The high level rights specification 614 sets forth what combinations of access rights are permissible. Such a rights specification is tailored to a particular document, and is capable of describing different groups of rights for different classes of downstream users. For example, a publisher may be given the right to distribute up to 100,000 copies of a document at a $1.00 per copy royalty, with additional copies yielding a $2.00 royalty. Similarly, users may be given the option to purchase a version of the document that "times out" after one month, one year, or never. Several possible limitations are described with reference to a detailed example, which is set forth below.

Digital Property Rights Language (DPRL) is a language that can be used to specify rights for digital works. It provides a mechanism in which different terns and conditions can be specified and enforced for rights. Rights specifications are represented as statements in DPRL. For details, see, for example, U.S. Pat. No. 5,715,403 to specify, entitled. "System for Controlling the Distribution and Use of Digital Works Having Attached Usage Rights Where the Usage Rights are Defined by a Usage Rights Grammar." Enforcement of rights and verification of conditions associated with rights is performed using the SPD technology.

Different rights can be specified for different parts of a digital work using a "work" specification. Within a work specification, different sets of rights applicable to this work are specified. Rights can be grouped into named-groups called "rights groups". Each right within a rights group is associated with a set of conditions. Conditions can be of different types: fee to be paid, time of use, type of access, type of watermark, type of device on which the operation can be performed, and so on. DPRL allows different categories of rights: transfer, render rights, derivative work rights, file management rights and configuration rights. Transport rights govern the movement of a work from one repository to another. Render rights govern the printing and display of a work, or more generally, the transmission of a work through a transducer to an external medium (this includes the "export" right, which can be used to make copies in the clear). Derivative work rights govern the reuse of a work in creating new works. File management rights govern making and restoring backup copies. Finally, configuration rights refer to the installation of software in repositories. An exemplary work specification in DPRL is set forth below:

```
(Work:
(Rights-Language-Version: 1.02)
(Work-ID: "ISDN-1-55860-166-X; AAP-2348957tut")
(Description: "Title: 'Zuke-Zack, the Moby Dog Story'
    Author: 'John Beagle'
    Copyright 1994 Jones Publishing")
(Owner: (Certificate:
        (Authority: "Library of Congress")
        (ID: "Murphy Publishers")))
(Parts: "Photo-Celebshots-Dogs-23487gfj" "Dog-Breeds-Chart-AKC")
(Comment: "Rights edited by Pete Jones, June 1996.")
(Contents: (From: 1) (To: 16636))
(Rights-Group: "Regular"
(Comment: "This set of rights is used for standard retail editions.")
(Bundle:
(Time: (Until: 1998/01/01 0:01))
    (Fee: (To: "Jones-PBLSH-18546789")(House: "Visa")))
(Play:
    (Fee: (Metered: (Rate: 1.00 USD) (Per: 1:0:0) (By: 0:0:1))))
(Print:
    (Fee: (Per-Use: 10.00 USD))
    (Printer:
        (Certificate:
            (Authority: "DPT"
            (Type: "TrustedPrinter-6")))
    (Watermark:
            (Watermark-Str: "Title: 'Zeke Zack -
            the Moby Dog' Copyright
            1994 by Zeke Jones. All Rights Reserved.")
```

-continued

```
            (Watermark-Tokens: user-id institution-location
            render-name
            render-time))))
(Transfer:)
(Copy: (Fee: (Per-Use: 10.00 USD)))
(Copy: (Access:
        (User: Certificate:
                (Authority: "Murphy Publishers")
                (Type: "Distributor")))))
(Delete:)
(Backup:)
(Restore:    (Fee: Per-Use: 5.00 USD)))))
```

This work specification has a rights group called "Regular," which specifies rights for standard retail editions of a book titled "Zuke-Zack, the Moby Dog Story." The work specification expresses conditions for several rights: play, print, transfer, copy, delete, backup, and restore. The work in the example includes two other parts, a photograph and a chart of breeds incorporated from other sources. A "bundle" specification bundles a set of common conditions that apply to all rights in the group. This specification states that all rights in the group are valid until Jan. 1, 1998 and that the fee should be paid to account "Jones-PBLSH-18546789". The clearing-house for this transaction should be Visa. The following contract applies: the work can be played by paying $1.00 every hour, where fee is accumulated by the second; the work can be printed on TrustedPrinter-6 which is certified by "DPT" for a fee of $10.00 per print; the printed copy should have a watermark string (as depicted) and a list of tokens signifying "fingerprint" information known at the time it is printed; this work can be copied either by paying $10.00 or by acquiring a distributor certificate from Murphy publishing, and unrestricted transfer, deletion or backing up of this work is permitted (restoration costs $5.00).

The high-level rights specification 614 is also subject to a pre-processing step (step 620), in which the high-level (Le., human-readable) specification is compiled into a more-efficient data structure representation for use by the invention.

The generic SPD 610 is then created (step 622) by combining the preprocessed content 612, the preprocessed rights specification 614, and the watermark 616. A watermark may be added by any means known in the art; it may be either visible or concealed within the SPD. The generic SPD 610 may also optionally be encrypted by the author/publisher 110 for transmission to the distributor 114 (FIG. 1).

The generic SPD 610 is then received by the distributor 114, and is stored for later customization. When a user request 624 is received by the distributor 114 (either directly or through the clearinghouse 122 or other intermediary), the distributor 114 creates a set of user permissions (step 626) that is consistent with both the user request 624 and the rights specification 614. If there is no such consistent set of permissions, then no further action is performed on that user's behalf (other than an optional notification message to the user).

The user permissions and the user's public key 628 are then used to generate (step 630) a customized SPD 632 adapted to be used by the user. The user permissions from step 626 are stored in the rights and permissions segment 514 of the SPD 632, and the user's public key 628 is used to encrypt the content in the content segment 516 of the SPD 632. A public-key encryption mechanism can be used to transform the SPD from the generic form to the customized SPD 632. Such a mechanism is useful if the SPD has to be confidentially transferred between different parties, e.g., author to publisher to retailer to consumer, with rights protection at each stage. It should further be noted that multiple user requests can be composed and accommodated within a single SPD 632; there are techniques known in the art that are capable of using multiple public keys to encrypt a document such that any of the users' private keys can be used to decrypt it.

The resulting custom SPD 632 is then transmitted to the user 118 by any available means, such as via a computer network or stored on a physical medium (such as a magnetic or optical disk).

Figure 7:
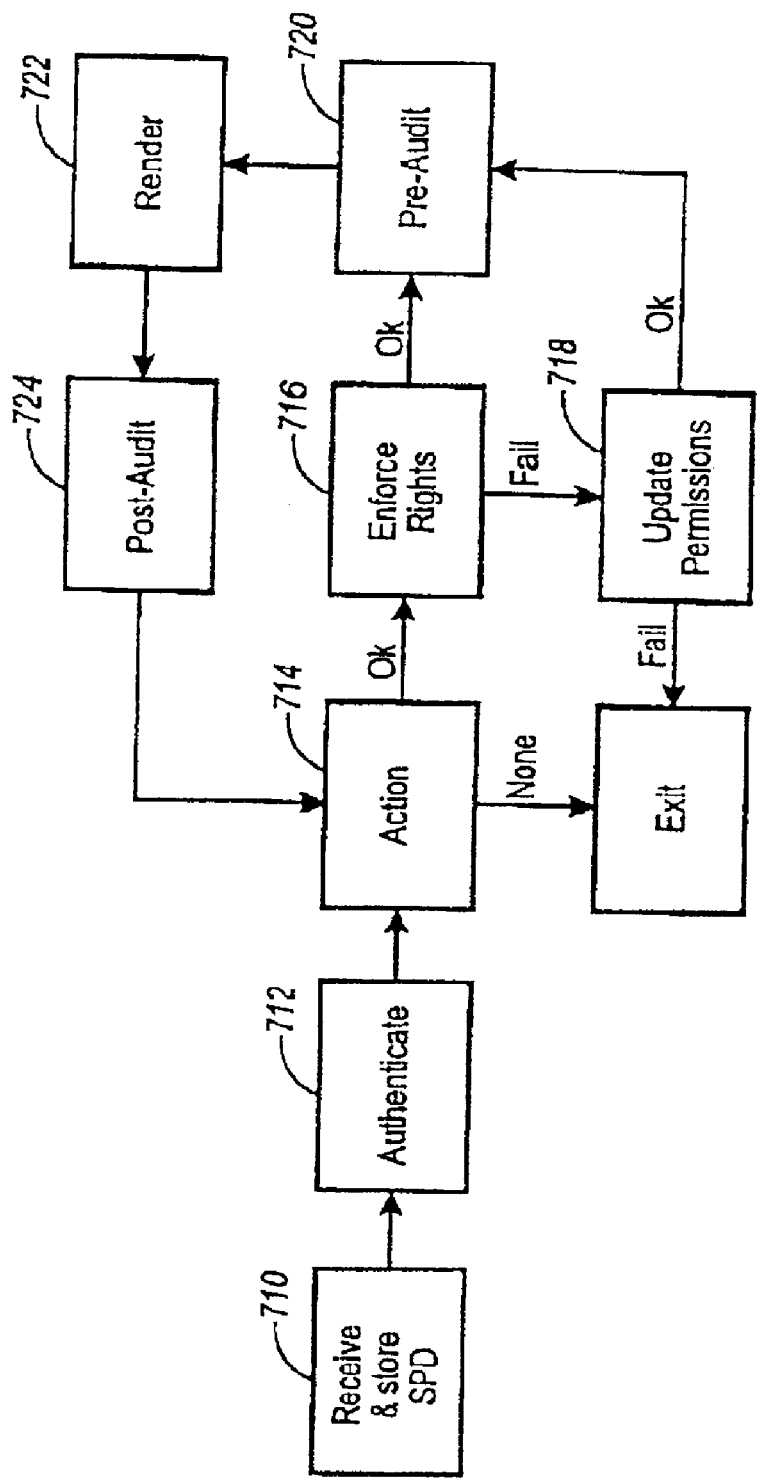
FIG. 7 is a flow diagram, from a user's perspective, illustrating the actions performed in handling and using a self-protecting document according to the invention.

The operations performed when a user receives an SPD are depicted in the flow diagram of FIG. 7. The SPD is first received and stored at the user's system (step 710); in many cases, it is not necessary to use the SPD right away. When usage is desired, the user is first authenticated (step 712), typically with a user name and a password or key. The system then determines what action is desired by the user (step 714). When an action is chosen, the rights-enforcement step of the invention (step 716) verifies the conditions associated with the desired action (such as the fee, time, level of access, watermark, or other conditions); this can be performed locally via the SPD applet 512 (FIG. 5) or by accessing a rights enforcement server.

If the rights enforcement step (step 716) fails, an update procedure (step 718) is undertaken. The user may choose to update his permissions, for example by authorizing additional fees. After the satisfactory verification of conditions, a pre-audit procedure (step 718) is performed, in which the SPD system logs verification status to a tracking service (e.g., the audit server 130 of FIG. 1). The content is then securely rendered to the screen (step 722) as discussed above. When the user is finished, a post-audit procedure (step 724) is performed in which the amount of usage is updated with the tracking service. The SPD system then awaits further action.

The protection yielded by the SPD is derived from the user's inability to capture a useful form of the document at any intermediate stage during the rendering process. This is accomplished by decrypting the document contents to a clear form at the latest possible stage, ideally in the last step.

Figure 8:
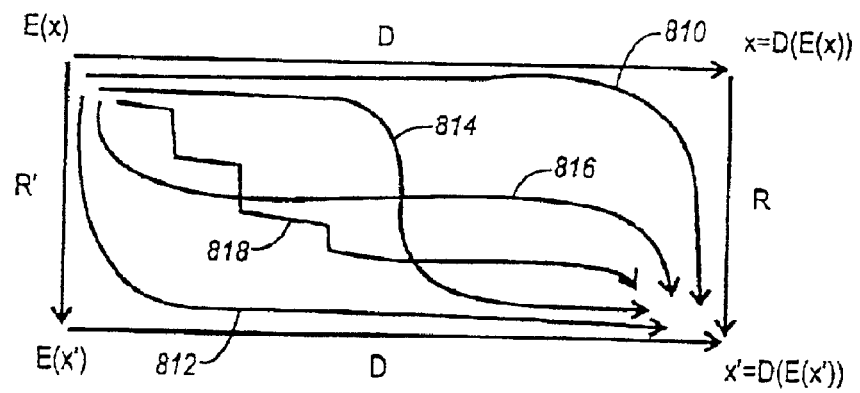
FIG. 8 is a graph illustrating several possible paths between an unrendered and encrypted document, and rendered and decrypted presentation data.

The SPD decryption model is illustrated in FIG. 8. E denotes the encryption function performed by the publisher, D denotes the decryption performed at the user's system, and R denotes the rendering transformation. Many prior systems use a first sequence of transformations 810, $D(E(x))$ followed by $R(D(E(x)))$. As stated previously, the early decryption leaves the document in a vulnerable state. Ideally, the transformations are performed in the reverse order 812, $R'(E(x))$ followed by $D(R'(E(x)))$. This postpones decryption to the latest possible time.

The existence of R', a rendering operation that can be performed before decryption, is determined by the following equality:

$$D((E'(x)))=R(D(E(x)))$$

In case that the encryption and decryption functions are commutative, that is, $E(D(x))=D(E(x))$ for any x, the existence of R' is ensured:

$$R'(y)=E(R(D(y))) \text{ for } y=E(x)$$

In practice, encryption and decryption functions in popular public-key cryptographic systems such as the RSA system and ElGamal discrete logarithm system satisfy the commutation requirement. This means that the transformation R' exists if these cryptographic systems are used for encryption and decryption.

The path $x'=D(R'(E(x)))$ portrays an ideal SPD solution to the document protection against unauthorized document usage and distribution. A scenario of distributing and using a document can be described as follows. When a user purchases the document, the document is encrypted using a user's public information and is transmitted over an insecure network channel such as the Internet. The encrypted document has the rights information attached to it and a protecting applet 512 that enforces the rights and permissions granted to the user by the content owner. Upon a user's request on using the document, the applet verifies the rights and permissions and generates from the encrypted document the presentation format of the original document. As any intermediate form of the document before the final presentation data is encrypted with the user's private information, the SPD model of document protection ensures that any intermediate form of the document is not useful to other systems wherever it is intercepted.

Clearly, this ideal model relies on whether or not the transformation R' that corresponds to the rendering transformation R can be computed efficiently, and in particular on whether or not an invocation of the decryption function D is necessary during an implementation of R'. A trivial case in which R' can be implemented efficiently is where R is commutative with the encryption function E. When this happens, $$R'(y)=E(R(D(y)))=R(E(D(y)))=R(y) \text{ for } y=E(x). \text{ In this case, } R'=R$$

Consideration of FIG. 8 reveals that many intermediate solutions (e.g., intermediate solutions 814, 816, and 818) to the document protection problem may exist on the user's system between the two extremes $x'=R(D(E(x)))$, which has no protection on $x=D(E(x))$, and $x'=D(R'(E(x)))$, which has ideal protection (under the assumptions set forth above). As depicted in FIG. 8, one may consider different paths from the encrypted document $E(x)$ to the presentation data x' that correspond to different combinations of partial rendering transformations and partial decryption transformations. Again, it should be recognized that delaying the decryption D in any path increases the protection level to the document.

Figure 9:
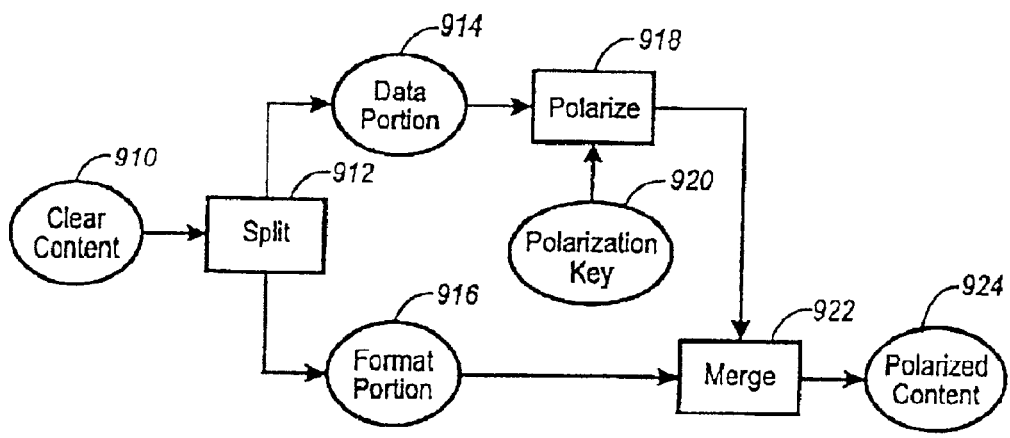
FIG. 9 is a flow diagram illustrating a polarization process according to the invention in which document format information remains in the clear for rendering.

As discussed above, one alternative method of delaying decryption to the last possible moment employs a polarization technique that encrypts only the document contents, not the format or the entire document as a whole. This possibility is shown in FIG. 9. Beginning with the clear document content 910 (which, it should be noted, does not exist in any single identifiable location during the user's processing, but is rather a transient state occurring within step 412 of FIG. 4), the document is split (step 912) into a data potion 914 and a format portion 916. The data portion 914 is polarized (step 918) using the polarization key 920 and merged (step 922) with the clear format portion 916. This results in polarized content 924 that can be rendered to polarized presentation data without first decrypting the content. It should be observed that this form of polarization is likely less secure than wholesale encryption with the polarization key, since a lot of information can potentially be derived from the layout of a document, word lengths, line lengths, etc.; however, this scheme will present a useful deterrent to casual copyright infringement.

Figure 10:
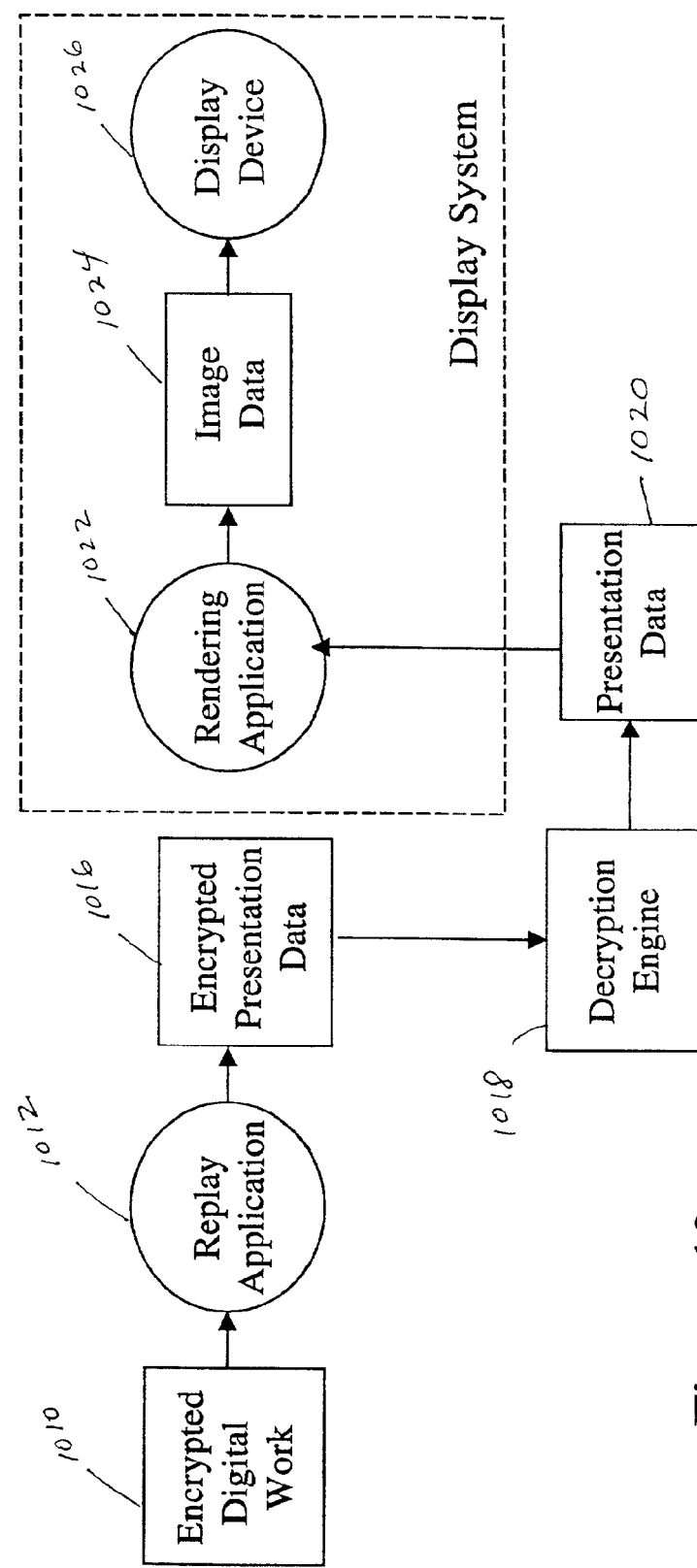
FIG. 10 is a block diagram of a method of format preserving encryption and trusted rendering according to the invention.

A method of protecting a digital work during replay which employs a blind transformation function is shown with reference to FIG. 10. In FIG. 10, an encrypted digital work 1010 is provided to replay application 1012. Digital work 1010 has been encrypted with a format preserving encryption scheme which enables replay application 1012 to generate encrypted presentation data 1016. Encrypted presentation data 1016 is then sent to decryption engine 1018 where it is decrypted into clear presentation data 1020. Presentation data is now in the clear, but less likely to be regenerated into the original digital form. If presentation data 1020 can be viewed or used directly by the user, then no further processing is required. However, sometimes an additional rendering is required by a display system such as a printer. In such a case, presentation data 1020 is provided to the display system's rendering application (in the case of a printer this could be a decomposer) 1022 which generated image data 1024. Image data 1024 is then provided to display device 1026.

In a general context, the problem of blind transformation can be stated as follows. Suppose a client Cathy wants a server Steve to compute for her a function value F(a,x) with his (public or private) data a and her private data x, and Cathy wishes, for privacy concerns, that the transformation is done without Steve knowing her private data x and the function value F(a,x). From Steve's point of view, this means that he computes F(a,x) for Cathy but with his eyes blindfolded. What this means is that Cathy would like the server Steve to perform the transformation only with data $E_k(x)$ encrypted using Cathy's key k, and return to her the function value $E_k(F(a,x))$ again encrypted using her key k. If Steve can perform the transformation using encrypted data, then Cathy has avoided disclosing the data x in the clear and the result F(a,x) in the clear. The ideal model of blind transformation with partially encrypted data is shown below:

$$\begin{array}{ccc} (a,x) & \xrightarrow{E_k} & (a, E(x)) \\ F\downarrow & & \downarrow F' \\ F(a,x) & \xleftarrow{D_{k^{-1}}} & F'(a, E(x)) \end{array}$$

The function F' that makes the diagram commute is what Steve rely computes, and the transformation result $F'(a, E_k(x))=E_k(F(a,x))$ is ready for decryption to reveal the desired function value F(a,x). As Steve does not "see" the clear data x as well as the function value F(a, x), he carries out a "blind" transformation for Cathy.

A protocol for blind transformation can be described as follows for the blind evaluation of the function P(a,x):
  (i) Cathy encrypts x using her encryption key k, resulting $E_k(x)$.
  (ii) Cathy sends $E_k(x)$ to Steve.
  (iii) Steve evaluates the modified version F' of the function F at the clear data a and encrypted data $E_k(x)$.
  (iv) Steve returns the result $F(a,E_k(x))$ back to Cathy.
  (v) Cathy decrypts $F(a,E_k(x))$ using her decryption key $k^{-1}$ and obtains F(a,x).

The ideal model of blind transformation introduced here can be regarded as a generalization of blind signatures and instance hiding. Blind transformation now allows partially encrypted data as input and, more importantly, it permits the function F' that the server computes to be possibly different from the intended function F. By computing F' instead of F, the server, though still blindfolded, is aware of the input being partially encrypted and hence is cooperative with the client. The blind transformation and secure mobile computing share a common goal in keeping the function value that the server computes private to the client, but they differ in that the client supplies the data input and the server supplies (a program that evaluates) the function in blind transformation, while it is the other way around in secure mobile computing. Note that blind transformation allows some portion of the data (e.g., a) to be in clear. This enables use of some dynamic yet clear data in the rendering process, such as display window size, reference positions for shifting content, scaling factor and coefficients in a rotation operation.

Blind transformation works only if there exist functions F and F' to compute the encrypted data. It can be shown that multivariate, integer coefficient affine functions using additive encryption schemes permit many document rendering functions of the affine type on the x- and y-coordinates to be evaluated in blind transformations. For a given encryption scheme S, a function F: X→X is said to be S-blindly computable if there exists some function F': X→X such that the computational complexity for evaluating F' is a polynomial of the one for evaluating F, and $$F(a,x)=D^{k-1}(F'(a,E_k(x)))$$

for any k∈K and x∈X. A function F: X→X is said to be blindly computable if there exists an encryption scheme S with X being a subset of its message space such that F is S-blindly computable.

Any multivariate, integer-coefficient affine function is S-blindly computable for any additive encryption scheme. Specifically, let $$F_{x_0;a_1,\ldots a_k}(x_1, \ldots, x_k) = x_0 + \sum_{i=1}^{k} a_i x_i$$

be a multivariate affine function with a constant $x_0 \in X$, integer coefficients $a_i$ and variables $x_1, \ldots x_k$ in X. Then, for any key k∈K, there exists a computationally efficient function $$F'_{y_0,b_1,\ldots b_k}(y_1, \ldots, y_k) = y_0 \oplus \bigoplus_{i=1}^{k} b_i y_i$$

such that $$E_k(F_{x_0,a_1,\ldots,a_k}(x_1,\ldots,x_k)) = E_k\left(x_0 + \sum_{i=1}^{k} a_i x_i\right) = F'_{y_0,b_1,\ldots,b_k}(E_k(x_k)).$$

Indeed, the constant $y_0$ and integer coefficients $b_i$ in $F'_{y_0,b_i,b_k}$ can be taken to be $y_0=E_k(x_0)$, $b_i=a_i$, i=1, . . . , k. The blind transformation of multivarate, integer coefficient affine functions using additive encryption schemes allows many document rendering functions of the affine type on the x-and y-coordinates to be evaluated in the blind manner, providing a theoretical foundation for the format-preserving encryption and ed rendering of documents described herein.

A document is usually a message that conforms to a certain format. For document encryption, in addition to simply encrypting the entire document, there are many different ways to encrypt only some parts of the document. The goal here is that the information leakage about the unencrypted portion cannot be used, or if it does leak, it is computationally difficult to reconstruct the clear, original document.

If an encryption scheme which preserves formatting information of the digital work, then any transformation function (replay application or rendering application) may be used.

An example of a format preserving encryption method is decribed for convenience with reference to token-based documents. The method for format-preserving encryption can be easily extended or applied to documents in other formats (such as HTML/XML, Microsoft WORD, Acrobat PDF, etc.). In a token-based format such as the Xerox DigiPaper, each page image of a document is represented as a "dictionary" of token images (such as characters and graphics elements) and location information (indicating where those token images appear in the page). Thus, multiple occurrences of the same token in the document can be represented using just a single image of that token in the dictionary.

The process of rendering a document in such a format is then accomplished by consecutively reading in token locations, retrieving images of the tokens from the dictionary and drawing the images at the specified locations. The benefits of token-based documents are compact file size and fast rendering speed for use in distributing, viewing and printing of electronic documents. In the DigiPaper format, tokens are stored as binary images using the CC Group 4 compression format, or as color images using JPEG compression, and the position information of the tokens is further compressed using Huffman coding.

For convenience, a token-based document D of P pages is formally modeled as a table (dictionary) of tokens T of size $|T|$, together with a sequence of P tables of locations $L_k$ of size $|L_k| (1 \leq i \leq P)$, representing the P page images. Each entry $T[J]$, $1 \leq |T|$, is a pair (id[j],t[j]) of an identifier id[j] and an image t[j] of the j-th token. Each entry $L_i[k]$, $1 \leq k \leq |L_i|$, in the i-th image location table $L_i$ is a triple (id[k],x[k],y[k]) representing the k-th token occurrence in the i-th page image, where id[k] is the token identifier, and x[k], y[k] are its x- and y-coordinate differences from the previous (k−1)-th token occurrence in the page. For example, take the simple document shown in FIG. 11. The token dictionary and location table (using x, y coordinates) for this document are shown in FIGS. 12 and 13 respectively.

The schematic pseudocode Render(D) below shows how page images of a document D are rendered. In the code, $x_0$, $y_0$ are the base references for the x- and y-coordinates for each page, Lookup(T,id[k]) is a subroutine that, upon the input of the dictionary T and a token identifier id[k], returns a token image t in T corresponding to the given identifier, and Draw(x,y,t) is a subroutine that draws the token image t at the location (x,y).

```
Render(D)
{
    Load T into memory
    for i = 1 to P do
    {
        Load L_i into memory
        x = x_0
        y = y_0
        for k = 1 to |L| do
        {
            x = x + x[k]
            y = y + y[k]
            t = Lookup(T,id[k])
            Draw(x,y,t)
        }
    }
}
```

In addition to the shifting transformation x'=x+a, y'=y+b as used in the schematic rendering process described above, there are several other coordinate transformations that may occur during the document rendering.

Scaling. The scaling transformation is of the form x'=ax, y'=by, where a and b are scaling factors for the x-coordinate and y-coordinate, respectively. Scaling may be caused by resizing the display window or print paper.

Rotation. The rotation transformation is $$\begin{bmatrix} x' \\ y' \end{bmatrix} = \begin{bmatrix} a & b \\ c & d \end{bmatrix} \begin{bmatrix} x \\ y \end{bmatrix}$$

for some constants a, b, c, d, which form a 2-by-2 rotation matrix. This transformation is needed when the page image is rotated.

Affine Transformation. An affine transformation is one of the form x=ax+by +e; y=cx+dy+f for some constants a, b, c, d, e, f. In the vector form, it is:

$$\begin{bmatrix} x \\ y \end{bmatrix} = \begin{bmatrix} a & b \\ c & d \end{bmatrix} \begin{bmatrix} x \\ y \end{bmatrix} + \begin{bmatrix} e \\ f \end{bmatrix}.$$

Clearly, shifting, scaling and rotation transformations are special cases of affine transformations. It is those affine type transformations that make it possible to achieve a high-level trusted rendering under encryption of coordinate is information using additive encryption schemes described below.

A special class of encryption schemes, namely, additive encryption schemes, are used to carry out blind transformation of functions of the affine type, which provides a foundation for trusted rendering of documents. Blind transformation by a rendering transformation R and R' of an encrypted document satisfies the relationship: D(R'(E(x)))= R(D(E(x))), where E is an encryption function and D is a decryption function for E. If E(x) is an additive encryption scheme, then R'=R.

An encryption scheme S generally consists of basically five components: (i) a message space X which is a collection of possible messages, (ii) a ciphertext space Y which is a collection of possible encrypted messages, (iii) a key space K which is a set of possible keys, (iv) a computationally efficient encryption function E: K×X→Y and (v) a computationally efficient decryption function D: K×Y→X. For each key k∈K, there is a unique key $k^{-1} \in K$, such that the encryption function $E_k$=E(k,): X→Y and decryption function $D_{k^{-1}}$, =D($k^{-1}$,): Y→X satisfy that, for every message x∈X, $D_{k^{-1}}(E_k(x))$=x. The key k is called an encryption key and $k^{-1}$ its corresponding decryption key.

Such defined encryption schemes can be varied in several ways to cover a wide range of concrete encryption schemes used in practice. One variation is to consider whether or not keys used for encryption and decryption are different. In the case where all encryption keys k are same as their corresponding decryption keys $k^{-1}$, the scheme is a symmetric (or private-key) one; otherwise, the scheme is asymmetric. In the case where, for all possible k, $k^{-1}$ is different from k and computationally difficult to derive from k, the scheme is a public-key encryption scheme.

Another variation is to differentiate deterministic and probabilistic encryption schemes. In a deterministic scheme, all the encryption and decryption functions $E_k$ and $D_{k-1}$ are deterministic functions, while in a probabilistic scheme the encryption function $E_k$ can be non-deterministic, namely, applying the function to a message twice may result in two different encrypted messages.

An additive encryption scheme is an encryption scheme whose message space X and ciphertext space Y possess some additive stares and encryption function $E_k$=E(k,): X→Y is homomorphic with respect to the additive structures. Specifically, let $X=(X, +, 0)$ and $Y=(Y, \oplus, 0)$ be two commutative semigroups with (possibly different) zero elements 0 satisfying, for example, for all x, $x+0=x$ and $0+x=x$, and efficient operations + and $\oplus$. An encryption scheme is said to be additive if, for any $k \in K$ and any x, $x' \in X$, $E_k(x+x')=E_k(x) \oplus E_k(x')$, and the operation $\oplus$ does not reveal the clear messages x and x'. The last condition on $\oplus$ makes additive encryption schemes non-trivial. Without this condition, the operation $\oplus$ on Y can be trivially defined $y \oplus y' = E_k(D_{k-1}(y) + D_{k-1}(y'))$; that is, it is accomplished by first decrypting the arguments, then adding them together and finally re encrypting the result.

Closely related to additive encryption schemes are multiplicative ones. An encryption scheme is said to be multiplicative if its spaces X and Y have the ring structures (i.e., in addition to their additive structures, they have respective multiplications x and $\oplus$ that are distributive over their additions + and $\oplus$, and multiplicative identities), the encryption function $E_k$ is homomorphic with respect to the multiplications, $E_k(x \times x') = E_k(x) \otimes E_k(x')$; and the operation $\otimes$ does not reveal the clear messages x and x'.

In general, additive (as well as multiplicative) encryption schemes are not non-malleable, since a non-malleable scheme requires that, given an encrypted message it is (at least computationally) impossible to generate a different encrypted message so that the respective clear messages are related. Accordingly, they have a weakness against active attacks where the adversary attempts to delete, add or alter in some other way the encrypted messages. However, when these schemes are used to encrypt documents, extra measures in data integrity and message authentication can be taken to reduce risks caused by these active attacks on document integrity as well as confidentiality. Moreover, end users are less motivated to initiate active attacks, as the attacks will affect document contents that the users are going to use and consume.

Not all encryption schemes can be defined as additive ones in an easy and natural manner. In fact, some encryption schemes are designed with a requirement of being non-additive or at least being able to convert into non-additive. Nevertheless, there are many examples of additive encryption schemes that can be used in the method of format-preserving encryption and trusted document rendering. Mult, Exp and EG (three deterministic schemes), OU (probabilistic) and RSA are examples of additive encryption schemes (with varying degrees of vulnerability to attack) may be used in the format preserving method.

Multiplicative Cipher (Mult) is a symmetric encryption scheme, where $X=Y=Z_n=\{0, 1, \ldots n-1\}$ for some integer $n>0$. The encryption of a message x using a key a is $$y=E_n(x)=ax(mod\ n)$$

and the decryption of a message y using a key a is $$x=D_a(y)=a^{-1}y(mod\ n),$$

where $a^{-1}$ is the multiplicative inverse of a modulo n.

Exponential Cipher (Exp) is a symmetric cipher, where $X=Z_{p-1}$ and the ciphertext space $Y=Z_p$ for some prime p, and K is the set of all generators of the multiplicative group $Z^*_p$. For any generator $g \in K$, the encryption function is defined as the exponential function $$E_g(x)=g^x(mod\ p),$$

while the decryption function is defined as the logarithm function $$D_g(y)=\log_g y(mod\ (p-1)).$$

Semi-probabilistic ElGamal Cipher (EG) extends the exponential cipher to the ElGamal cipher, which leads the ElGamal cipher to run in a semi-probabilistic mode. For each message $x \in Z_p$ where $Z_p = \{1, \ldots p-1\}$ for some prime p, g is a generator in the multiplicative group $Z^*_p$, the private decryption key for a user is a random number $a \in Z^*_{p-1}$, the public encryption key $\alpha = g^a(mod\ p) \in Z_p$, the encryption $E_\alpha(x, r)$ depends on a uniformly chosen random number $r \in Z_{p-1}$:

$$E_\alpha(x,r)=(g^r(mod\ p), x\alpha^r(mod\ p))=(s,t).$$

For an encrypted message (s, t), the decryption function is defined as $$D_\alpha(s,t)=t(s^\alpha)^{-1}(mod\ p).$$

The ElGamal cipher in its original form as described above is hardly additive. However, the operator $\oplus$ can be partially defined on the ciphertext of those x's that share a same random number r, as follows:

$$E_\alpha(x,\ r) \oplus E_\alpha(x',\ r) = (s,\ t) \oplus (s,\ t') = (s,\ t+t') = E_\alpha(x+x'(mod\ p),\ r).$$

This partially defined operation is applicable when a batch of messages are encrypted using a same random number r.

Okamoto-Uchiyama Cipher (OU). Okamoto and Uchiyama proposed an additive, public-key encryption scheme in T. Okamoto and S. Uchiyama "A New Public-Key Cryptosystem as Secure as Factoring", *Eurocrypt'98*, Ice Notes in Computer Science 1403, 308–318, 1998, which is probabilistic and provably as secure as the intractability of factoring $n=p^2q$ against passive adversaries. Choose two large primes p, q of k bits for some $k>0$, and let $n=p^2q$. Choose $g \in Z^*_n$ at random such that the order of $g_p=g^{p-1}(mod\ p^2)$ is p. Let $h=g^n(mod\ n)$. The message space X of the OU scheme is the set $Z^*_p$ (not the set $\{1, \ldots 2^{k-1}\}$ as claimed by Okamoto and Uchiyama) and the ciphertext space Y is $Z_n$. For a user, a public key is a tuple (n, g, h, k) and its corresponding private key is the pair (p, q) of the primes. To encrypt a message $x \in X$, a random number $r \in Z$ is chosen uniformly. Then the encrypted message is $$y=E_{(n,g,h,k)}(x,r)=g^x h^r(mod\ n).$$

To decrypt the encrypted message y, a "logarithmic" function $L: \Gamma \rightarrow \Gamma$, $$L(x)=(x-1)p' \ (mod\ p^2)$$

is used, where $\Gamma$ is the p-Sylow subgroup of $Z^*_{p2}$, i.e., $\Gamma = x \in Z^*_{p2} | x \equiv 1 (mod\ p)\}$. With the function L, the decryption function is $$x=D_{p,q}(y)=L(y^{p-1}(mod\ p^2))L(mod\ p^2).$$

New additive encryption schemes can be constructed from existing ones via the composition construction of encryption schemes. The composition construction can also be used to construct additive encryption schemes from non-additive ones. For instance, the composition of the exponential cipher Exp and any multiplicative encryption scheme S (such as RSA) results in an additive one.

Additive encryption schemes enable blind transformation with partially encrypted data, which serves a foundation for trusted rendering of documents, as discussed above. In particular, additive encryption schemes can be used to perform blind transformation of affine functions with clear coefficients and encrypted variables.

Returning to the example of a token-based document, since a token-based document D consists of a dictionary T of token images and a sequence of location tables $L_i$ (one for each page image), the idea is to encrypt the content of the dictionary T and location tables $L_i$, resulting in a dictionary T' of encrypted token images and tables $L'_i$ of encrypted locations. Recall that the dictionary T consists of a collection of pairs (id[j], t[j]), j=1, . . . |T|. Associate with T is a subroutine Lookup in the rendering process that, given a valid token identifier id, returns its corresponding token image t in T. In encrypting the dictionary T, there are three basic choices: encrypting token identifiers, token images, or both. Encrypting either identifiers or token images helps unlink the connection between the identifiers and their token images. In addition, encrypting token images protects proprietary token images. In any case, it is desirable to allow valid access to the dictionary only within the rendering process P, while making it computationally difficult to obtain a copy of the entire, clear contents of the dictionary. This is possible because in many cases the valid identifiers (e.g., Huffman codewords) are only a very small subset of all binary strings of up to a certain length, and consequently any exhaustive identifier search will not be efficient.

More formally, given the dictionary T and the Lookup subroutine that accesses it, the requirement on encrypting the dictionary is that the encrypted dictionary T' and the corresponding subroutine Lookup' satisfy the following constraints:

(1) For any encrypted identifier $E_k$(id), lookup'(T',$E_k$(id))=$E_k$(Lookup(T,id)) and (2) Given T' and Lookup', it is computationally infeasible to reconstruct T.

For an encryption scheme S, T' and Lookup' can be constructed as follows. Let ID be the set of all syntactically possible identifiers; in particular, ID* ⊆ ID, where ID*={id |(id,t)∈T}. Let h be a one-way hash function whose domain is ID. Then the encrypted token dictionary T' is derived from T as follows: for every (id,t) pair in T, a pair (h(id),$E_k$(t)) is inserted into T'. The modified subroutine Lookup' uses the algorithm:

```
Lookup'(T',id)
{
    id' = h(id)
    t' = Lookup(T',id')
    return (t')
}
```

Notice that the return value of Lookup' is an encrypted token image. The decryption of this image will be postponed to into the final subroutine Draw' in the rendering process, which is part of the trusted rendering described below.

This dictionary encryption is computationally feasible, both in terms of storage-space overhead and in terms of running-time overhead, to compute with encrypted versions of token dictionaries. If the hashing and encryption algorithms used in the Lookup' subroutine are secure enough, then it is computationally very difficult to recover T given T' and Lookup'.

Since each entry in a location table $L_i$ consists of an identifier, and location difference in x- and y-coordinates, any combination of the three elements can be encrypted. To encrypt the location information, an additive encryption scheme is recommended to enable applying any rendering transformation of the affine type to the location coordinates. For identifiers, a tradeoff between document compression and document protection must be made. In a token-based document, a token identifier is usually a codeword of some coding scheme for the compression purpose. For example, when the Huffman code is used to compress the document, the identifiers are the binary Huffman codewords of the tokens based on their occurrence frequency in the document. In this case, simply using a deterministic encryption scheme to encrypt these identifiers offers no effective protection on theme. This is because the scheme does not change the occurrence frequency of each token, and hence anyone can re-count the number of occurrences of the encrypted identifiers to reconstruct the Huffman codewords that are the identifiers. Therefore, in order to hide occurrence frequencies of the tokens in the document, it is preferred to use a probabilistic encryption scheme to encrypt the identifiers. However, this will interfere with the optimal encoding carried in the identifiers (codewords) and reduce the document compression ratio. This may be undesirable for token-based documents, as achieving a good document compression is one of the design goals for token-based documents.

A reasonable compromise for encrypting $L_i$, is suggested. Choose an additive encryption scheme S, preferably a probabilistic and asymmetric one like the Okamoto-Uchiyama cipher OU if encryption and decryption efficiency is not a big problem. For each entry (id,x,y) in $L_i$, insert (id,$E_k$(x),$E_k$(y)) into $L'_i$. If it is also necessary to encrypt the identifiers, entrees like ($E_k$(id),$E_k$(x),$E_k$(y)) may be inserted into the location table $L'_i$. But in this case, the entries in the encrypted dictionary T' need to be changed to ($E_k$(id),$E_k$(t))'s, and the subroutine Lookup' above also needs to be modified to reflect the change.

With the format-preserving encryption of a token-based document mentioned above, the document content can also be protected during the rendering process. The idea is to delay decryption into Draw'(x,y,t). The rendering process is given shown below.

```
Render(D)
{
    Load T into memory
    for i = 1 to P do
    {
        Load L_i into memory
        x = E_k(x_0)
        y = E_k(y_0)
        for k = 1 to |L| do
        {
            x = x ⊕ x[k]
            y = y ⊕ y[k]
            t = Lookup'(T',id[k])
            Draw'(x,y,t)
        }
    }
}
Draw'(x,y,t)
{
    x = D_{k-1}(x)
    y = D_{k-1}(y)
    t = D_{k-1}(t)
    Draw(x,y,t)
}
```

During the process, all the coordinate and token image information remains encrypted before calling the subroutine Draw'(x,y,t). This is possible for the coordinate information because the encryption scheme is additive. Consequently, the content protection level and rendering process performance of the rendering process rely on the security strength and computational complexity of the scheme used.

In another embodiment of the invention, a digital work is polarized enabling trusted rendering or replay of the digital work without depolarization of the digital content or the presentation data. In this embodiment, the digital work is the type which includes digital content and resource information (also called a system context). Resource information includes formatting information or other information used by a replay or rendering application to convert the digital work into presentation data.

Polarization is a type of transformation which renders the original content unreadable or unusable. For a digital work w, a polarization scheme T, which uses a seed s, generates a polarized digital work w' according to: w'=T(w, s). The same transformation T may also be used to generate the polarized resource information S' according to S'=T(S, s). In this example, a seed s is used to make reverse engineering of the polarization scheme more difficult.

For example, a document type digital work may be polarized using a simple polarization scheme. In a document, the digital content comprises a series of characters in a particular order or location. If the document is to be displayed on a viewing device, each character must be able to be displayed at a particular location for viewing by a user on the viewing device, such as on a monitor. A coordinate system is required for displaying each character on the monitor, so each character in the document can be displayed on the monitor. The digital content contains coordinate information which is referenced by the monitor's coordinate system. For example, in this paragraph, the letter appears at the top line, indented by five spaces.

A simple polarization scheme for jumbling the text of the above paragraph is to translate the location of the letters with resect to the coordinate system. Each letter in the paragraph has an (x,y) location. Suppose the location (x,y) of each letter in the above paragraph are polarized using a seed (a,b) from a user's system. The following polarization functions may be used to polarize the above paragraph:

$Y=b^y$, for the vertical axis; and $X=x/a$, for the horizontal axis.

In this example, the user's device coordinate system must be polarized in order for the replay application to transform the digital content into presentation data i.e., display the paragraph on the monitor descrambled. The user's device coordinate system must be polarized using the same seed (a, b) to generate a polarized coordinate system. The following transformation functions are used to compute both x and y locations of a given point:

$Y=\log_b(Y)$, for the vertical axis; and $X=aX$, for the horizontal axis, where $\log_b$ is the logarithm with base b.

When the replay application obtains the location of a character in the polarized digital work, the location is given by $(X,Y)=(x/a, b^y)$. This value is then applied to the device coordinate system $(X,Y)=(\log_b(Y), aX)=(x,y)$. Thus the correct location of "F" is displayed on the user's monitor. In both cases of polarization, the polarized forms of the resource information and the digital work maintain an inherent association. These complementary polarized forms of the resource information and the digital work result in the basis for a effective mechanism to protect the digital work. While the replay application is able to display the polarized digital work, it is only with the polarized system context that the replay application is able to provide clear presentation data.

While polarization, in general, is not as rigorous a protection as encryption, depending on the sensitivity of the digital work to be protected, different levels of polarization can be used. A sensitive work may require a high level of polarization; a lower valued work may require a weaker type of polarization. If the user's environment is trusted a lower level of polarization may be used. An advantage to using a lower level of polarization is that it requires fewer system resources to create the polarized digital work and to render or replay the polarized digital work. The type and quality of the polarization seed may also be used in combination with the polarization scheme to determine the level and strength of the polarization. For example, a more complex polarization seed (such as one containing authorization information from a trusted source or a dynamic seed) will provide a higher level of polarization and strength.

Polarization typically occurs at the distribution or manufacturing location. Digital works are polarized usually prior to distribution to the user or customer using a polarization scheme chosen by the manufacturer or distributor. Resource information to be polarized may also be preselected in advance to delivery. Preferably a seed is used for each polarization scheme. Also preferably, the seed is generated using information provided by the user's system context.

When a user purchases a digital work the user preferably provides information from the user system in which the user intends to replay the digital work. This information may be used to generate the polarization seed for both the polarized digital work and the polarized resource information (sometimes called the polarized system context). Then the polarized digital work and polarized system context or polarized resource information are provided to the user. Also, typically, but not needed for operation of this embodiment of the invention, the polarized digital work and polarized system context may be encrypted prior to distribution to the user. Decryption of both the polarized digital work and system context may be required prior to replay of the polarized digital work into presentation data, depending on the encryption scheme used.

The process for creating a polarized digital work is divided into three steps. These steps are generation of the polarization seed, polarization of the digital work and, polarization of the resource information. Once the polarization seed is generated, the polarization engine is seeded with it. The polarization engine takes as input the digital work or the resource information, and generates the polarized form of the digital work or the resource information based upon the transformation function seeded with the polarization seed. During replay of the polarized digital work, the prized resource information is utilized to generate the presentation data and/or image data. The same or different polarization transformation functions can be used for the digital work and the resource information.

Figure 14:
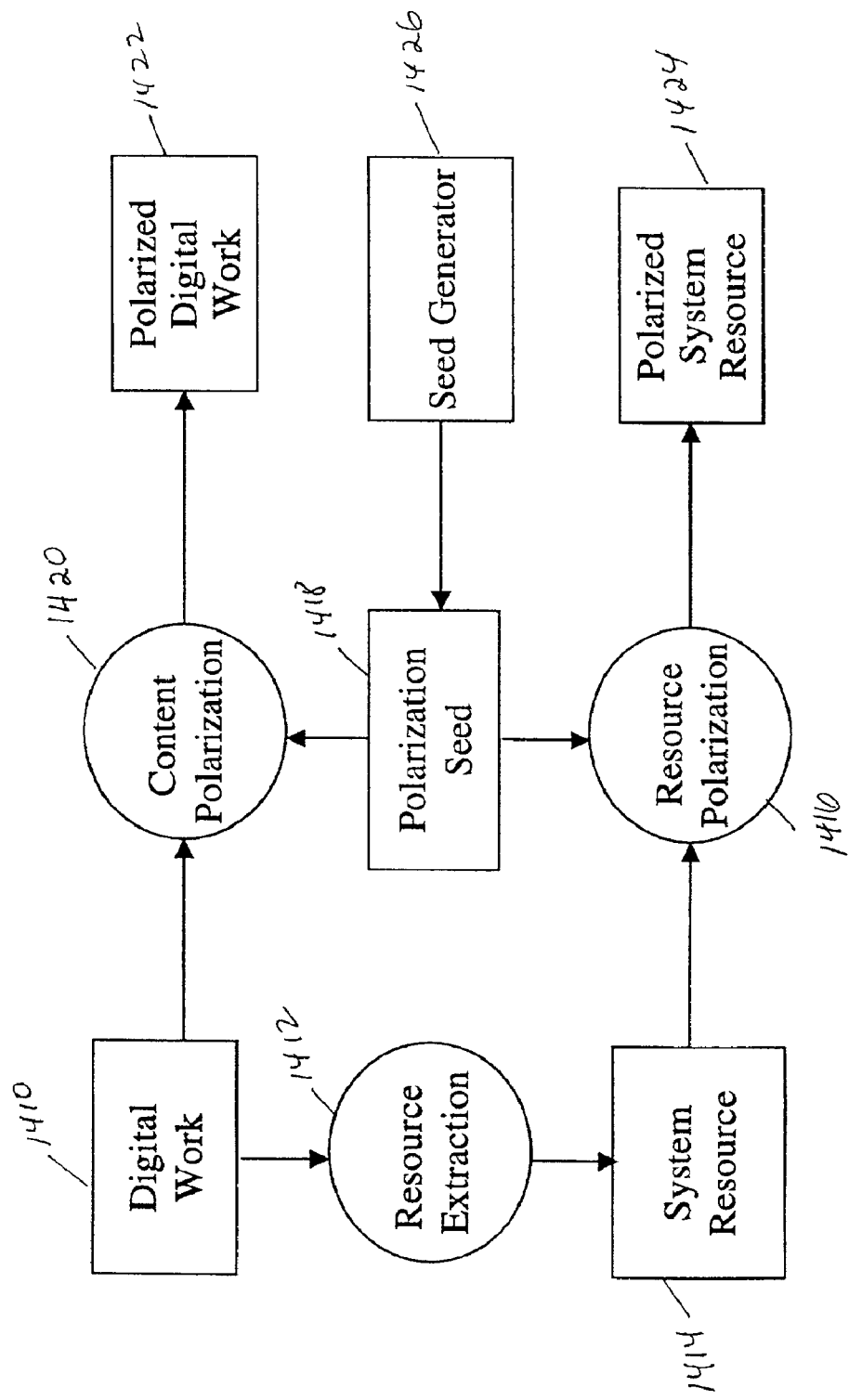
FIG. 14 is a block diagram illustrating a process for generating a polarized digital work and polarized system resource according to the invention.

A process for creating a polarized digital work is shown with reference to FIG. 14. A digital work 1410 includes digital content and a set of resource information used for formatting and rendering the digital content into a form usable or viewable by a user. The digital work 1410 goes through a process of content polarization 1420 in which the digital content is polarized and the resource information is preserved, creating polarized digital work 1422. The content polarization 1420 may occur as shown with reference to FIG. 9. A digital work typically includes content, instructions and formatting. While polarization can occur to the entire digital work, preferably only the content is polarized; the instructions and formatting are not polarized. However, in some instances, for some replay applications, some of the resource information contained within the digital work may also be polarized. This is similar for the format preserving encryption method described above.

Resource extraction 1412 extracts at least one resource information from the set of resource information associated with digital work 1410. Extraction consists of copying the resource information into a system resource file 1414. System resource 1414 is then polarized at resource polarization 1416 to become polarized system resource 1424. The polarization scheme for content polarization and resource polarization need not be the same. Preferably, each polarization scheme employs a polarization seed 1418 which is generated by seed generator 1426. Several exemplary methods for seed generation are described below. In particular, in a preferred embodiment, the polarization seed is based on unique information from the user's system.

Several techniques for generation of the polarization seed may be used. For example, a seed generator which generates a number from a random number generator may be used. This method, referred to as stateless polarization, does not depend on any secret key information and user system information. The process for stateless polarization yields a specific value for the system for polarization. The inherent vulnerability for digital security systems may be found in mishandling secret information, mathematical complexity, and algorithmic complexity. Eliminating the secret information seals off one target of attack. With stateless polarization, a random number generator produces the polarization seed. In this case, once the polarization process is complete the seed is discarded without a trace. Hence, the security of the system is free from attack focused on compromising the secret information, and the user need not divulge sensitive information that may be deemed a privacy violation.

Another seed generator that may be used is a state-based generator. The state-based seed generator constructs a seed by first acquiring system state information from the user's replay system or rendering device. System state information includes hardware identifiers, system settings and other system state-related information. While there is much value in stateless polarization, other security requirements may require use of an inseparable link to a particular user system or device. By generating the polarization seed from system/device-specific information, the polarization engine will produce a digital work that is polarized to a form that corresponds to a specific system/device.

The polarization seed generator can also be tied to an authorization process. In authorization-based polarization, the seed generation can be tie in with the outcome of the authorization process. A separate authorization repository (which is a trusted source) provide authorization information as part of some other security feature associated with delivering access to a digital work to a user. The trusted source of authorization information may be an online authorization repository as described in U.S. Pat. No. 5,629,980. This authorization information is then used to generate a polarization seed.

If a stateless polarization seed is used, the digital work and its resource information may be polarized and stored together for delivery to a user when a user purchases the associated rights of use for the particular digital work. If one of the other polarization seed generation methods is used, polarization typically must wait until the user provides the system state or authorization information before the digital work and resource information may be polarized.

An embodiment which provides a higher level of protection in terms of ensuring that the digital work may be replayed only on a specific physical system or device uses a dynamic state based polarization seed. In this embodiment, a polarization engine and polarization seed generator must be provided to the replay application or rendering device along with the digital work and resource information. In this embodiment, the digital work and resource information are polarized prior to replay and rendering using a seed which is generated based on the dynamic state of the particular system or device. The dynamic state may come, for example, from the system clock, CPU utilization, hard drive allocation, cursor coordinates, etc. By polarizing the work using a snapshot of a dynamic state, the work is locked to a particular system configuration (i.e., state) in time. Polarization of the digital work, and ultimately its blind replay (described below), is based upon a dynamically evolving state. The evolution of the dynamic state does not yield unique secret information that allows repeatability of the polarization process, and hence dynamic-state based polarization makes compromising the polarized digital work and system context more difficult. Since the polarization process is carried out within a trusted system, it is implied that the process can not be deconstructed.

The actual process of polarization can be, as described in the example above, an algorithmic-based transformation-parameterized by the polarization seed. During polarization, the data and resource identifiers of the digital work are transformed as described above. The structure of the digital work is unaltered, however, such that the original format, such as PDF, DOC, WAV, or other format, is retained much like in the format preserving encryption. Similarly the polarization of the resource information yields a polarized form of the resource information such that the resource identifiers, element identifiers and resource characteristics are transformed, yet the structure of the system context remains unaltered. By polarizing the digital work and resource information according to the same seed based on a user's specific device or system information, an inseparable relationship is established such that the work cannot be replayed to its clear form with any other device or user system. If circulated in an unauthorized manner, the protection remains in effect.

During blind replay, the unique characteristics of the polarized resource information enable the replay application to properly replay the polarized digital work and generate unpolarized or clear presentation data. Because the digital work and the resource information were transformed in a complementary manner, the polarized elements of the digital work, such as the resource identifiers and data, unknowingly reference the complementary elements within the resources of the system context. Due to the matching transformation the proper elements within the context are identified by the replay application such that the resultant presentation data appears in the clear. Hence, the work is protected until the last possible moment after replay.

As discussed earlier, the conventional distribution of digital works via the web is relatively straightforward. The work is created using an editor, posted to a web site, accessed by the user audience and replayed in a viewer or on a display system. If a content owner does not desire to protect his/her digital work (or if the content owner trusts all users who will receive the work), the digital work is provided "in the clear" i.e., without any encoding, encryption or other protection for direct use by any user.

If the digital work is downloaded onto the user's system, it is typically stored in memory. If the digital work is provided via a storage media, such as floppy disk or CD ROM or DVD-ROM, the digital work is usually accessed directly from storage media.

Figure 15:
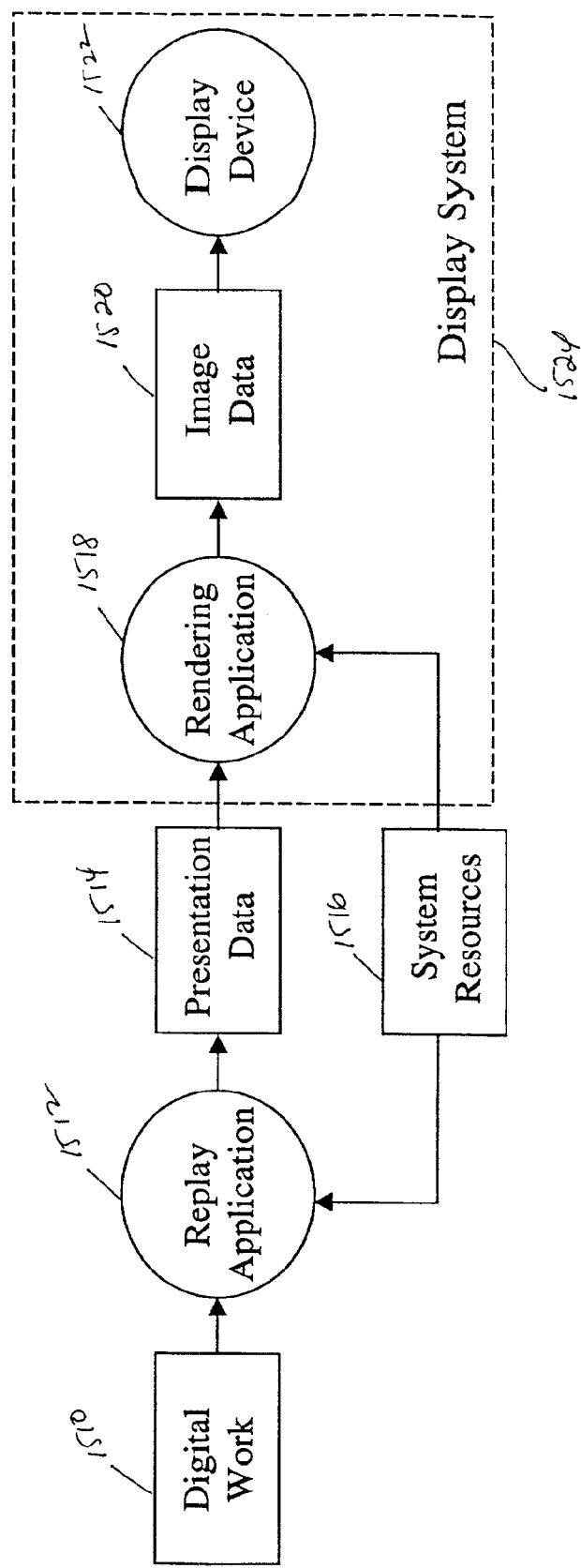
FIG. 15 is a block diagram illustrating the conversion of a digital work into image data according to the art.

In order to play the digital work, referring to FIG. 15, the digital work 1510 is provided to a replay application 1512. In the case of a document or other type of digital work which requires formatting information or resource information, the digital work will include digital content plus resource information setting forth the particular system context or system resources needed by the replay application to process the digital content. For example, the digital work 1510 may be a text document in which the text is displayed using the Arial font. When replay application 1512 accesses resource information on digital work 1510 indicating Arial font is used, it accesses the appropriate system resources 1516 (which in this case is the Arial font table) and uses the system resource information to convert the digital content into presentation data 1514.

In some replay applications, converting the digital content into presentation data is sufficient for use by the user. In others, presentation data is only an intermediate form which must be further converted. For example, in the case of a display system 1524 which is a printer, the presentation data 1514 must be further rendered by rendering application 1518. Rendering application 1518 may be a decomposer within the printer. Rendering application 1518 uses other system resources 1516 to transform the presentation data 1514 into image data 1520. Image data 1520 is in a form which can be directly displayed on display device 1522 (in the case of a printer, output as a printed document).

Figure 16:
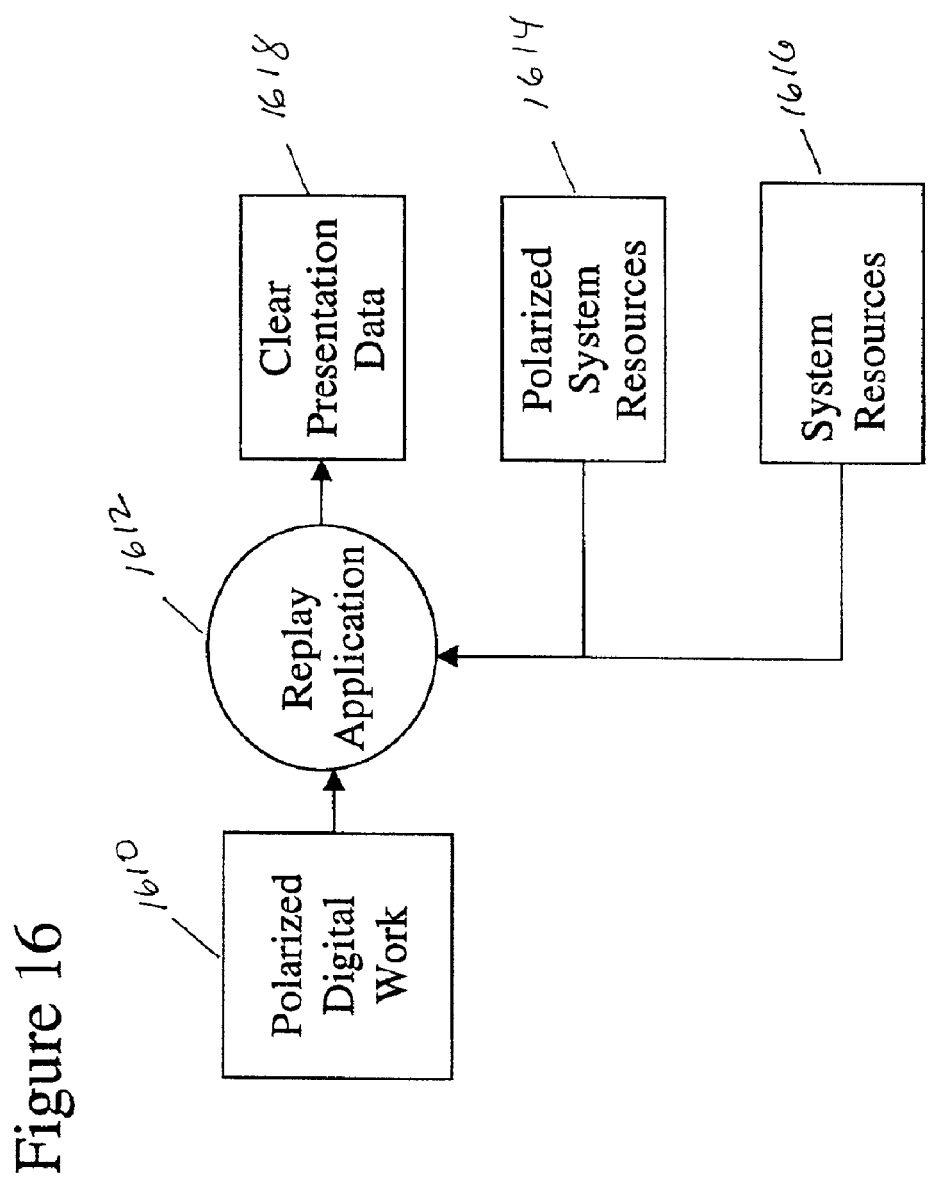
FIG. 16 is a block diagram illustrating a system for blind replay of a polarized digital work according to the invention.

In addition to the earlier described systems and methods for protecting a digital work during replay, a digital work may be protected during replay by polarizing the digital work in accordance with a first polarization scheme which produces polarized content and preserves the digital work's resource information. A portion of the digital works resource information is copied and polarized in accordance with a second polarization scheme. Referring to FIG. 16, replay application 1612 uses the polarized resource information 1614 (and any other system resource information 1616 that may be required) to transform the polarized digital work 1610 into clear presentation data 1618. Presentation data is necessarily in the clear, which means it can be captured by other programs (such as a screen capture utility program). However, the output of such other programs is not in the same format and frequently not of the same fidelity as the original digital work.

The polarized resource information can be thought of as acting like a polarizing filter to bring the polarized digital content into a clear image (presentation data). This system is a blind replay system in that the replay application, which can be any commercial application, does not know or need to know the clear digital content. Blind replay operates for any transformation function R, such that R(w',s')=R(w,s), where w' is the polarized digital content, w is the clear digital content, s' is the polarized resource information and s is the unpolarized resource information. Blind replay of polar digital works using polarized resource information is different from blind transformation described above in that blind replay produces clear presentation data without having to depolarize it. In blind transformation, the replay application converts the encrypted digital work into encrypted presentation data, which must then be decrypted. In both cases, the user does not see the original digital work in clear form.

Blind replay (also called blind rendering) using a polarized digital work and polarized resource information can be used alone to protect the digital work during replay as well as in addition to regular encryption. For example, the polarized digital work and polarized resource information may be encrypted to protect it during distribution, then decrypted at the user's system into the polarized digital work and polarized resource information. The user must first obtain permission from the content owner or the distributor acting on behalf of the content owner (in order to decrypt the encrypted digital work). Once the user is qualified, the encrypted polarized digital work and the encrypted polarized resource information are decrypted and the polarized digital work is replayed in the replay application using the polarized resource information.

Figure 17:
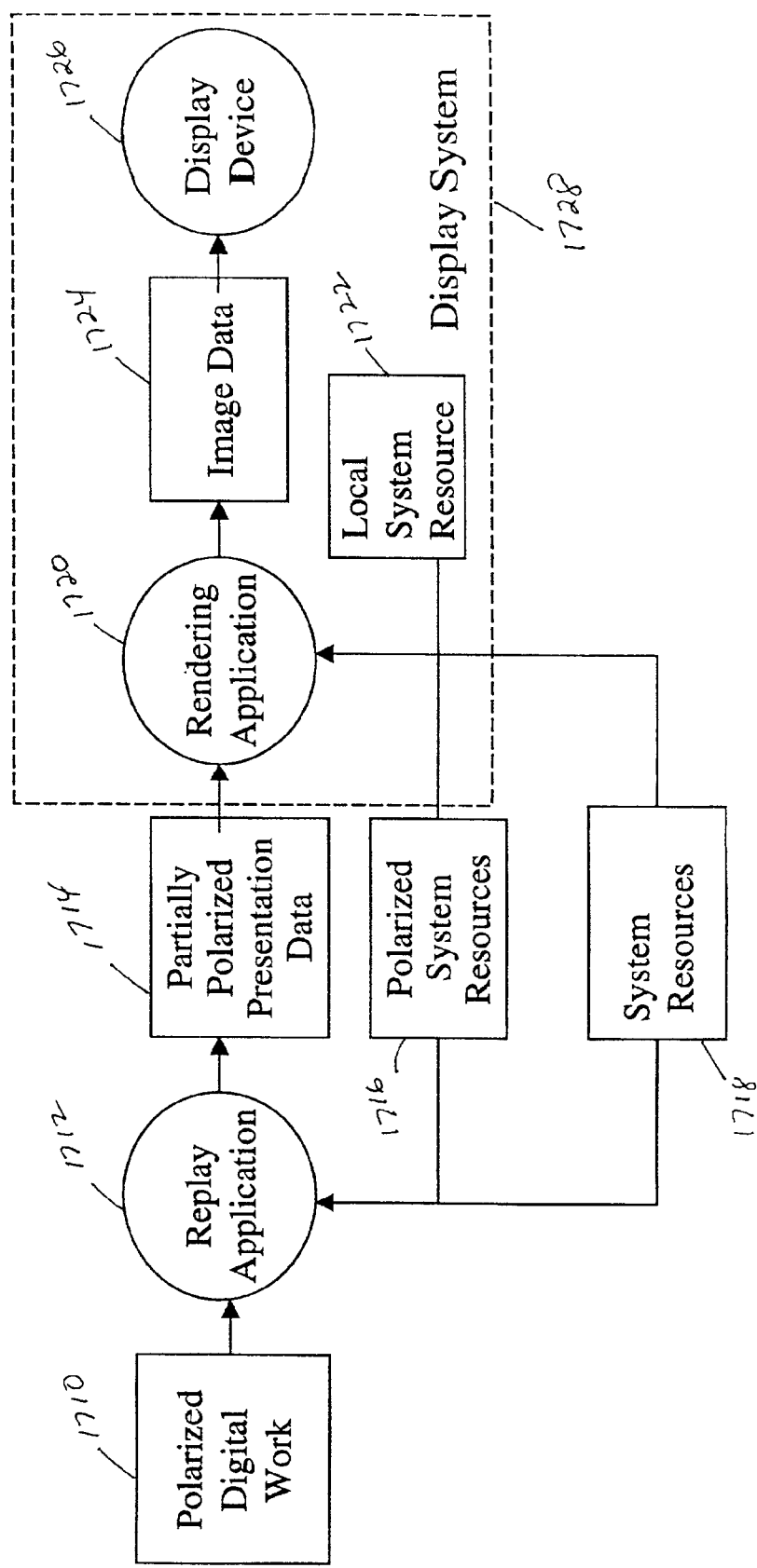
FIG. 17 is a block diagram illustrating another system of blind replay of a polarized digital work according to the invention.

The complexity of rendering a digital work into a usable form for viewing by a user can be used to further protect the digital work during replay. Referring to FIG. 17, polarized digital work 1710 is provided to replay application 1712, which uses polarized system resources 1716 and other system resources 1718 to transform polarized digital work 1710 into partially polarized presentation data 1714. In this embodiment, display system 1728 is needed to transform presentation data into a form usable by the user. Partially polarized presentation data 1714 is provided to rendering application 1720 which uses polarized system resources 1716, local system resources 1722 and system resources 1718 to transform the partially polarized presentation data 1714 into clear image data 1724. Clear image data 1724 is then displayed on display device 1726 for use by the user. In this embodiment, presentation data is still polarized, taking the location of the clear data to a later point of the display process and providing further protection.

To enhance usability of the system for polarization of digital works, the polarized resource information may be separated from the digital work and tied to a ta ble device such as a smart can. In this embodiment, the replay application 1712 plays back the work using the polarized system resources 1716. Instead of having the polarized system resources 1716 stored in a local memory, along with the polarized digital work, 1710, the polarized system resources 1716 is stored in a transportable device such as a smart card. Also, the smart card, possibly with hardware enhanced features, may possess attributes that provide for tamper resistance. Within the transportable context, the polarized data is processed by the replay application 1712 to yield the partially polarized presentation data and then provided to the rendering application 1720.

Many different types of digital works can be protected throughout use using the polarization method. For example, if the digital work is a document or text file, the replay application may be a word processor, system resources or resource information may include font tables, page layout, and color tables. If the digital work is audio or video data (e.g., streams), the replay application may be an audio or video player. The presentation data will be the audio/video final data stream. The display system may be an audio/video device. The rendering application may be the audio/video device driver. The image data may be the audio/video device data stream and the display device may be the audio/video rendering device (system or monitor, for example).

For a digital work that is an audio/video data stream, the system resources or resource information may include characteristics of the audio/video device: sample rate (samples per second—e.g., 8 kHz, 44.1 kHz), sample quality (bits per sample—e.g, 8, 16); sample type (number of channels—e.g., 1 for mono, 2 for stereo), and sample format (instructions and data blocks). A table of some audio/video data stems and their corresponding resource information or variable parameters which can be selected for polarization is set forth below:

TABLE 1

Digital Work: A/V Data (Streams)

| Extension | Origin | Variable Parameters (#Fixed) | Compression | Player |
|---|---|---|---|---|
| .mp3 | MPEG standard | sample rate, quality, #type | MPEG | MP3 Player |
| .ra | Real Networks | sample rate, quality, #type | Plug-ins | Real Player |
| .wav | Microsoft | sample rate, quality, #type | ADPCM | Window Media |
| .snd | Apple | sample rate, #quality, #type | MACE | QuickTime |

The structure of a digital work can be used advantageously for polarization. While it is possible to polarize the entire digital work, it is more convenient to polarize only a portion of the digital work. Most digital works include three primary elements: instructions, data, and resources. Preferably, only the data and resources of the digital work are polarized, much like the format preserving encryption method described above. By selectively transforming only the data and resources, a digital work may be transformed such that the content remains in the original format, yet the data and resources are incomprehensible.

The general layout of a digital work of the document type is shown in FIG. 18. In FIG. 18, digital work 150 includes Page Descriptor 152, Control Codes 154, 158 and 162, Resource Identifier 156, and Data 160 and 164. The Page Descriptors 152 define the general layout of a work. For instance, the page size, page number, and margins fall into the category of Page Descriptors with respect to digital documents. Control Codes 154, 158 and 162 are similar in that they describe the presentation of the content. Examples include commands to set text position, output text, set font type, and set current screen coordinates. Resource Identifiers 156 simply reference the desired resources. In the digital document realm, resources could vary from font typeface to background color. Finally, Data 160, 164 represent the core information communicated by the digital work. This could be the drawing coordinates used in a multimedia clip or the character codes for rendering as a digital document.

An example of a digital work (in this case a simple digital document) and one of its polarized forms are shown in FIGS. 19 and 20, an HTML document in clear and polarized form. The tags <html> and <body> are Page Descriptors. The <font> . . . <\font> tag is an example of a Control Code for setting font resource characteristics, while "Arial" and "14" are Resource Identifiers for an Arial typeface, 14 point font. The "Hello World" text is the Data, or the core information of the work. The <p> is another Control Code to signal the beginning of the paragraph. Finally, the document is closed out with Page Descriptors <\body> and <\html> to identify the end of the document.

FIG. 20 shows what the digital work of FIG. 19 looks like in a polarized form. It can be seen that the Page Descriptor and Control Code tags remain unaltered; the <html>, <body> and <font> tags are unchanged. Whereas, the Resource Identifiers, "Arial" and "14:", have been transformed to indecipherable values. Similarly, the Data, "Hello World", has also been transformed to an indecipherable value. By transforming the Resource Identifiers and the Data the content is rendered meaningless while in the polarized form. Yet, the fact that the Page Descriptors and Control Codes remain intact allows for the document to retain its original format, which in general could be Adobe PDF, RealNetworks RAM, Apple QuickTime, etc.

The system context (or system resources or resource information) can be thought of as the collection of system resources available to a replay application on a particular system. For example, it may include the Font Table, Color Palette, System Coordinates and Volume Setting. When a digital work is input to a replay application, the replay application uses the particular resource information contained within the digital work to transform the digital content into presentation data. Each system context or resource information contained within a digital work is or can be altered to be unique to a system for which it can be replayed. The system context is a required element for the use of the digital work, tying use of the digital work to a specific system or physical device or replay application for replay. The Resource Identifiers and Data within the digital work may either directly or indirectly reference elements contained within the system context. Polarizing the digital work and system context enable blind rendering into clear presentation data. By polarizing the system context with a polarization seed that is tied to a unique system, the resulting polarized system context can be a unique environment in which a complementary polarized digital work, which has been polarized with the same polarization seed, may be accessed and replayed.

FIG. 21 illustrates a typical configuration of the system context. The elements include the resource identifier (Rum), element identifier (ElemID), and resource characteristics (Characteristics). The ResID includes pertinent information for other system components to reference the resources. The ElemID is the identifier of an individual element within the resource. Finally, the Characteristics are the actual resource characteristics used to express the individual resource element FIG. 22 is an illustration of the resource for the font table pertaining to the Arial typeface. The key resource identifier in this case is the font name, "Arial". Following the ASCII convention, the number 48 identifies the individual resource element identifier. The resource element characteristics for the ElemID represent the information to express the letter 'a'.

FIG. 23 is an illustration of the polarized the system context for the font resource shown in FIG. 22. The resource identifier itself is transformed to "k13k2". The element identifier itself need not be transformed, as it is sufficient enough to transform the resource characteristics alone. In this case, "48" is depicted as transformed to express the characteristics for 'Y' instead of 'a'.

Polarization and blind rendering may be used for many different types of digital works. In addition to documents, polarization and blind rendering may be used for audio/video data. As noted above, audio/video data is generally provided in the form of streams. A replay application is the audio/video player which transforms the digital audio/video stream into a final data stream which can be processed by a transducer (speaker) into an audio output or by a display into a video image.

Referring to FIG. 17, replay application 1712 corresponds to an audio/video player which generally operates by sampling the audio/video input sterns 1710 at some sample rate, quality and type accepted by a target audio/video device. It uses the audio/video system resources to sample, mix and produce audio/video steams and then mixes the resampled audio/video streams to produce a final audio/video steam in a format expected by the target device. In the case of an audio/video player, the presentation data 1714 is the final mixed audio/video stream at some sample rate, quality, type and format expected by a target audio/video device.

The target audio/video device (e.g., rendering application 1720) is some hardware system that is able to convert the audio/video stream (presentation data 1714) at a specific sample rate, quality, type (channel) and format (e.g., PAL or NTSC) to the device audio/video data 1724. Examples of audio devices include sound cards, speakers, monitors and the digital to analog converter located within the audio/video device. Many devices are able to play audio/video streams at a range of different sample rates. Image data 1724 (e.g. an audio signal or a video image stream) is generated by the audio/video device driver 1720 and "consumed" by the display device 1726.

For example, to polarize an audio/video data stream, it may be split into two or more separate stems. One stream is polarized and one stream is unpolarized. Each stream may have different device characteristics (resource information): sample rates, channels, qualities and/or formats associated with it. The device characteristics (one or more of the stream's sample rates, channels, qualities and/or formats) may also be polarized to generate the polarized resource information.

Blind replay of the polarized audio/video stream is accomplished in a similar manner as for a polarized digital document. The replay application (audio/video player) mixes together the unpolarized stream and the polarized stream, and using the polarized resource information, produces a polarized final data stream for the target audio/video device with a correct set of resource information. The target device (1720) uses the polarized resource information to play the polarized data stream generating clear sound/visual effects (1724).

While certain exemplary embodiments of the invention have been described in detail above, it should be recognized that other forms, alternatives, modifications, versions and variations of the invention are equally operative and would be apparent to those skilled in the art. The disclosure is not intended to limit the invention to any particular embodiment, and is intended to embrace all such forms, alternatives, modifications, versions and variations. For example, the portions of the invention described above that are described as software components could be implemented as hardware. Moreover, while certain functional blocks are described herein as separate and independent from each other, these functional blocks can be consolidated and performed on a single general-purpose computer, or further broken down into sub-functions as recognized in the art. Accordingly, the true scope of the invention is intended to cover al alternatives, modifications, and equivalents and should be determined with reference to the claims set forth below.

What is claimed is:

1. A method of protecting a digital work, z, during transformation by a transformation function, F, into presentation data F(z), wherein the digital work includes digital content and formatting information, comprising:
   encrypting the digital work, z, in accordance with a format preserving encryption scheme, E, which preserves formatting information of the digital work;
   transforming the encrypted digital work E(z) into encrypted presentation data, F(E(z)); and
   decrypting the encrypted presentation data, F (E(z)), in accordance with a decryption function, D, to obtain the presentation data, F(z), wherein D(F(E(z)))=F(z).

2. The method of claim 1, wherein the encryption function E is an additive encryption scheme.

3. The method of claim 2, wherein the additive encryption scheme is selected from the group consisting of Mult, Exp, EG, OU, RSA and compositions thereof.

4. The method of claim 1, wherein F is any multivariate, integer coefficient affine functions and E is an additive encryption scheme.

5. The method of claim 1, wherein F comprises an affine type coordinate transformation in x- and y- coordinates of the form x'=ax+bx+e and y'=cy+dy+f, where a, b, c, d, e, and f are coefficients, (x, y) is the original location of an element in the digital work z and (x', y') is the transformed location.

6. The method of claim 5, wherein the encryption scheme E encrypts the variables x and y while leaving the coefficients (a, b, c, d, e, f) in the clear.

7. The method of claim 1, wherein the digital work comprises a token-based document comprising a dictionary T of token images, a table of coordinate location information corresponding to each page of the document, and the transformation function F includes a Lookup routine that accesses the table of coordinate location information.

8. The method of claim 7, wherein the table of coordinate location information is encrypted using an additive encryption scheme and the dictionary of token images is encrypted using any encryption scheme.

9. The method of claims 7, wherein the dictionary T consists of a collection of pairs, each comprising an identifier and an associated token, (id, t), the table of location information comprises a table of tuples, (id, x, y) each comprising an identifier id, an x-coordinate and a y-coordinate for each page of the document, and wherein the transformation function F includes a subroutine Lookup that, given a valid token identifier id, returns its corresponding token image t in T.

10. The method of claim 9, wherein E is an additive encryption scheme and any combination of the tuples (id, x, y) may be encrypted by E.

11. The method of claim 9, wherein the location table is encrypted by an additive encryption scheme and the token identifiers are encrypted by a probabilistic encryption scheme.

12. The method of claim 7, wherein the token images comprise characters and graphics.

13. The method of claim 1, wherein the digital work z comprises data x and coordinate information a, wherein the transformation function F converts encrypted data x and coordinate information a into presentation data F(a, E(x))=E(F(a, x)).

14. A system of protecting a digital work, z, during transformation by a transformation function, F, into presentation data F(z), wherein the digital work includes digital content and formatting information, comprising:
   an encryption engine for encrypting the digital work, z, in accordance with a format preserving encryption scheme, E, which preserves formatting information of the digital work;
   a transformation function F for transforming the encrypted digital work E(z) into encrypted presentation data, F(E(z)); and
   a decryption engine for decrypting the encrypted presentation data, F(E(z)), in accordance with a decryption function, D, to obtain the presentation data, F(z), wherein D(F(E(z)))=F(z).

15. The system of claim 14, wherein the encryption function E is an additive encryption scheme.

16. The system of claim 15, wherein the additive encryption scheme is selected from the group consisting of Mult, Exp, EG, OU, RSA and compositions thereof.

17. The system of claim 14, wherein F is any multivariate, integer coefficient affine functions and E is an additive encryption scheme.

18. The system of claim 17, wherein the encryption scheme E encrypts the variables x and y while leaving the coefficients (a, b, c, d, e, t) in the clear.

19. The system of claim 14, wherein F comprises an affine type coordinate transformation in x- and y-coordinates of the form x'=ax+bx+e and y'=cy+dy+f, where a, b, c, d, e, and f are coefficients, (x, y) is the original location of an element in the digital work z and (x', y') is the transformed location.

20. The system of claim 19, wherein the table of coordinate location information is encrypted using an additive encryption scheme and the dictionary of token images is encrypted using any encryption scheme.

21. The system of claim 19, wherein the dictionary T consists of a collection of pairs, each comprising an identifier and an associated token, (id, t), the table of location information comprises a table of tuples, (id, x, y) each comprising an identifier id, an x-coordinate and a y-coordinate for each page of the document, and wherein the transformation function F includes a subroutine Lookup that, given a valid token identifier id, returns its corresponding token image t in T.

22. The system of claim 21, wherein E is an additive encryption scheme and any combination of the tuples (id, x, y) may be encrypted by E.

23. The system of claim 21, wherein the location table is encrypted by an additive encryption scheme and the token identifiers are encrypted by a probabilistic encryption scheme.

24. The system of claim 19, wherein the token images comprise characters and graphics.

25. The system of claim 14, wherein the digital work comprises a token-based document comprising a dictionary T of token images, a table of coordinate location information corresponding to each page of the document, and the transformation function F includes a Lookup routine that accesses the table of coordinate location information.

26. The system of claim 14, wherein the digital work z comprises data x and coordinate information a, wherein the transformation function F converts encrypted data x and coordinate information a into presentation data $F(a, E(x)) = E(F(a, x))$.

* * * * *

UNITED STATES PATENT AND TRADEMARK OFFICE
CERTIFICATE OF CORRECTION

PATENT NO. : 6,885,748 B1  
APPLICATION NO. : 09/536089  
DATED : April 26, 2005  
INVENTOR(S) : Xin Wang Page 1 of 1

It is certified that error appears in the above-identified patent and that said Letters Patent is hereby corrected as shown below:

On the Title Page, Item (63) the "Related U.S. Application Data" is replaced with the following:

-- Continuation-in-part of application No. 09/178,529, filed on Oct. 23, 1998, now Pat. No. 6,519,700 --

Signed and Sealed this
Thirty-first Day of January, 2012

David J. Kappos
*Director of the United States Patent and Trademark Office*